United States Patent
Han et al.

(10) Patent No.: US 11,016,612 B2
(45) Date of Patent: May 25, 2021

(54) DECORATION FILM, COVER PANEL COMPRISING DECORATION FILM AND METHOD FOR MANUFACTURING DECORATION FILM

(71) Applicant: Samsung Display Co., Ltd., Yongin-si (KR)

(72) Inventors: Sangwoo Han, Hwaseong-si (KR); Dongho Lee, Cheonan-si (KR); Hyunhee Lee, Seoul (KR); Jinho Cho, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 137 days.

(21) Appl. No.: 15/831,223

(22) Filed: Dec. 4, 2017

(65) Prior Publication Data

US 2018/0157375 A1    Jun. 7, 2018

(30) Foreign Application Priority Data

Dec. 5, 2016  (KR) .................. 10-2016-0164515

(51) Int. Cl.
   *G06F 3/042*   (2006.01)
   *B44C 5/04*    (2006.01)
   (Continued)

(52) U.S. Cl.
   CPC ...... *G06F 3/0421* (2013.01); *B29D 11/00788* (2013.01); *B44C 5/0469* (2013.01);
   (Continued)

(58) Field of Classification Search
   None
   See application file for complete search history.

(56) References Cited

U.S. PATENT DOCUMENTS

2009/0067048 A1    3/2009  Battiato et al.
2013/0280463 A1*  10/2013  On ..................... B32B 3/10
                                                       428/38
(Continued)

FOREIGN PATENT DOCUMENTS

KR    10-2007-0066645 A    6/2007
KR    10-2012-0113933       10/2012
(Continued)

OTHER PUBLICATIONS

EPO Extended Search Report dated Apr. 10, 2018, for corresponding European Patent Application No. 17205323.3 (9 pages).

*Primary Examiner* — Christopher R Lamb
(74) *Attorney, Agent, or Firm* — Lewis Roca Rothgerber Christie LLP

(57) ABSTRACT

A decoration film includes: a base film; a first decoration portion on a surface of the base film; and a second decoration portion on another surface of the base film, and overlapping the first decoration portion, and the first decoration portion includes a first concavo-convex portion on at least a portion of the base film, the second decoration portion includes a second concavo-convex portion on at least a portion of the base film corresponding to the first concavo-convex portion, and the decoration film further includes at (Continued)

least one of a first deposition layer on the first concavo-convex portion and a second deposition layer on the second concavo-convex portion.

26 Claims, 23 Drawing Sheets

(51) Int. Cl.
  *H04M 1/02* (2006.01)
  *C23C 28/04* (2006.01)
  *C23C 28/00* (2006.01)
  *B29D 11/00* (2006.01)
  *G02F 1/1333* (2006.01)

(52) U.S. Cl.
  CPC ............ *C23C 28/00* (2013.01); *C23C 28/042* (2013.01); *C23C 28/42* (2013.01); *H04M 1/0283* (2013.01); *G02F 1/13332* (2021.01); *G02F 1/133331* (2021.01); *G06F 2203/04103* (2013.01); *G06F 2203/04111* (2013.01); *H04M 1/0202* (2013.01); *H04M 1/0266* (2013.01)

(56) References Cited

U.S. PATENT DOCUMENTS

| | | | |
|---|---|---|---|
| 2013/0342977 A1* | 12/2013 | Chang | H05K 5/0217 361/679.01 |
| 2014/0192416 A1 | 7/2014 | Wang | |
| 2014/0268590 A1* | 9/2014 | Kim | B05D 3/067 361/748 |
| 2015/0014023 A1* | 1/2015 | Kim | G06F 3/041 174/251 |
| 2015/0124179 A1* | 5/2015 | Ko | G02F 1/13338 349/12 |
| 2015/0212626 A1 | 7/2015 | Kim et al. | |
| 2016/0016845 A1 | 1/2016 | Cho et al. | |
| 2016/0066456 A1* | 3/2016 | Min | G06F 1/16 428/172 |
| 2017/0008255 A1* | 1/2017 | Shin | B32B 15/08 |

FOREIGN PATENT DOCUMENTS

| | | |
|---|---|---|
| KR | 10-2013-0097048 A | 9/2013 |
| KR | 10-1423372 B1 | 7/2014 |
| KR | 10-2016-0075406 A | 6/2016 |
| WO | WO 2015/130102 A1 | 9/2015 |

* cited by examiner

DECORATION FILM, COVER PANEL COMPRISING DECORATION FILM AND METHOD FOR MANUFACTURING DECORATION FILM

CROSS-REFERENCE TO RELATED APPLICATION

This application claims priority to and the benefit of Korean Patent Application No. 10-2016-0164515, filed on Dec. 5, 2016 in the Korean Intellectual Property Office, the entire disclosure of which is incorporated by reference herein.

BACKGROUND

1. Field

Aspects of embodiments of the present invention relate to a decoration film, a cover panel including a decoration film, and a method of manufacturing a decoration film.

2. Discussion of Related Art

A flat panel display, such as an organic light emitting diode ("OLED") display device or a liquid crystal display ("LCD") device, includes a plurality of pairs of electric field generating electrodes and an electro-optical active layer disposed therebetween. The OLED display device includes an organic light emitting layer as an electro-optical active layer, and the LCD device includes a liquid crystal layer as an electro-optical active layer.

Generally, a display device includes a display panel for generating and displaying an image, and a cover panel on the display panel to protect the display panel. The cover panel includes a window panel on a surface of the display panel on which an image is displayed and a back panel on a surface of the display panel on which an image is not displayed.

Recently, cover panels having various colors and patterns have been made to improve an aesthetic sense of an appearance of the display device.

It is to be understood that this background of the technology section is intended to provide useful background for understanding the technology and as such disclosed herein, the technology background section may include ideas, concepts, or recognitions that were not part of what was known or appreciated by those skilled in the pertinent art prior to a corresponding effective filing date of subject matter disclosed herein.

SUMMARY

According to an aspect of one or more embodiments of the present invention, a decoration film that may be used for a cover panel of a display device, and a method of manufacturing the decoration film are provided.

According to another aspect of one or more embodiments of the present invention, a cover panel including the decoration film is provided.

According to another aspect of one or more embodiments of the present invention, a display device including the cover panel is provided.

According to one or more exemplary embodiments, a decoration film includes: a base film; a first decoration portion on a surface of the base film; and a second decoration portion on another surface of the base film, and overlapping the first decoration portion. The first decoration portion includes a first concavo-convex portion on at least a portion of the base film, the second decoration portion includes a second concavo-convex portion on at least a portion of the base film corresponding to the first concavo-convex portion, and the decoration film further includes at least one of a first deposition layer on the first concavo-convex portion and a second deposition layer on the second concavo-convex portion.

The second decoration portion may further include a light blocking print layer on the second concavo-convex portion.

The first deposition layer may include at least one of a metal, a metal oxide, and a metal nitride.

The second deposition layer may include at least one of a metal, a metal oxide, and a metal nitride.

The first concavo-convex portion and the second concavo-convex portion may include a polymer resin.

The first concavo-convex portion may have a refractive index from about 1.7 to about 2.8.

The first decoration portion may further include a light transmitting print layer on the first concavo-convex portion.

The first decoration portion may further include a light transmitting print layer between the base film and the first concavo-convex portion.

The decoration film may further include a first polymer resin layer between the base film and the first concavo-convex portion.

The first concavo-convex portion may be formed integrally with the first polymer resin layer.

The decoration film may further include a second polymer resin layer between the base film and the second concavo-convex portion.

The second concavo-convex portion may be formed integrally with the second polymer resin layer.

The first concavo-convex portion may include a plurality of first linear convex portions spaced apart from each other, and the second concavo-convex portion may include a plurality of second linear convex portions spaced apart from each other.

The first linear convex portions and the second linear convex portions may be parallel to each other.

The first linear convex portions and the second linear convex portions may not be parallel to each other.

According to another exemplary embodiment, a method of manufacturing a decoration film includes: forming a first polymer resin layer on a surface of a base film; forming a first concavo-convex portion on at least a portion of the first polymer resin layer; applying a polymer resin over another surface of the base film to form a second polymer resin layer; forming a second concavo-convex portion on at least a portion of the second polymer resin layer; and at least one of forming a first deposition layer on the first concavo-convex portion and forming a second deposition layer on the second concavo-convex portion.

Forming of the first deposition layer on the first concavo-convex portion may include: forming a deposition layer over an entire surface of the first polymer resin layer including the first concavo-convex portion; forming a mask above a portion of the deposition layer overlapping the first concavo-convex portion; and removing the deposition layer from portions other than portions above the first concavo-convex portion.

Forming of the second deposition layer on the second concavo-convex portion may include: forming a deposition layer over an entire surface of the second polymer resin layer including the second concavo-convex portion; forming a light blocking print layer on a portion of the deposition layer overlapping the second concavo-convex portion; and removing the deposition layer from portions other than portions above the second concavo-convex portion using the light blocking print layer as a mask.

The method may further include: forming a light transmitting print layer on one surface of the base film, before forming the first polymer resin layer on one surface of the base film.

The method may further include forming a light transmitting print layer on the first deposition layer.

According to another exemplary embodiment, a cover panel includes: a plate substrate; an adhesive layer on the plate substrate; and a decoration film on the adhesive layer. The decoration film includes: a base film; a first decoration portion on a surface of the base film; and a second decoration portion on another surface of the base film, overlapping the first decoration portion, the first decoration portion includes a first concavo-convex portion on at least a portion of the base film, the second decoration portion includes a second concavo-convex portion disposed corresponding to the first concavo-convex portion, and the decoration film further includes at least one of a first deposition layer on the first concavo-convex portion and a second deposition layer on the second concavo-convex portion.

The first decoration portion may be arranged toward the adhesive layer.

The first concavo-convex portion may have a refractive index greater than a refractive index of the adhesive layer.

The refractive index of the first concavo-convex portion may be greater than the refractive index of the adhesive layer by about 0.3 or more.

The second decoration portion may further include a light blocking print layer on the second concavo-convex portion.

The plate substrate may have light transmittance.

According to another exemplary embodiment, a display device includes: a display panel having a display area and a non-display area; and a cover panel on the display panel. The cover panel includes: a plate substrate; an adhesive layer on the plate substrate; and a decoration film on the adhesive layer. The decoration film includes: a base film; a first concavo-convex portion on at least a portion of a surface of the base film, a second concavo-convex portion on at least a portion of another surface of the base film corresponding to the first concavo-convex portion, and at least one of a first deposition layer on the first concavo-convex portion and a second deposition layer on the second concavo-convex portion.

The first concavo-convex portion and the second concavo-convex portion may overlap the non-display area of the display panel.

The foregoing description of some aspects, exemplary embodiments, and features is illustrative only and is not intended to be in any way limiting. In addition to the illustrative aspects, exemplary embodiments, and features described above, further aspects, exemplary embodiments, and features will become apparent by reference to the drawings and the following description.

BRIEF DESCRIPTION OF THE DRAWINGS

A more complete appreciation of the present invention will become more apparent by describing in further detail some exemplary embodiments thereof with reference to the accompanying drawings, wherein.

DETAILED DESCRIPTION

Figure 1:
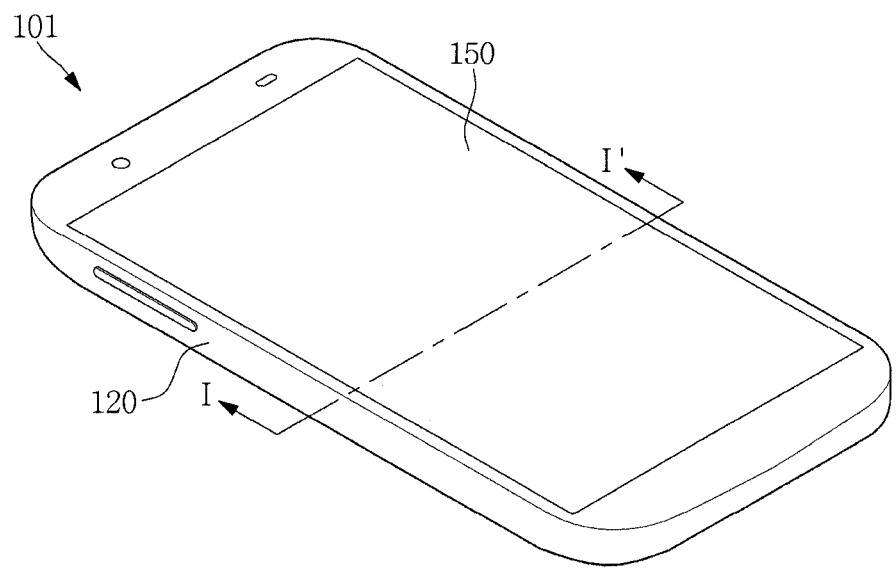
FIG. 1 is a perspective view illustrating a display device according to an exemplary embodiment.

Some exemplary embodiments will now be described more fully herein with reference to the accompanying drawings. Although the invention may be modified in various manners and may have various exemplary embodiments, some exemplary embodiments are illustrated in the accompanying drawings and will be mainly described in the specification. However, the scope of the invention is not limited to the exemplary embodiments shown and described and should be construed as including all changes, equivalents, and substitutions included in the spirit and scope of the present invention.

In the drawings, thicknesses of a plurality of layers and areas may be illustrated in an enlarged manner for clarity and ease of description thereof. When a layer, area, or plate is referred to as being "on" another layer, area, or plate, it may be directly on the other layer, area, or plate, or one or more intervening layers, areas, or plates may be present therebetween. Conversely, when a layer, area, or plate is referred to as being "directly on" another layer, area, or plate, intervening layers, areas, or plates may be absent therebetween. Further, when a layer, area, or plate is referred to as being "below" another layer, area, or plate, it may be directly below the other layer, area, or plate, or one or more intervening layers, areas, or plates may be present therebetween. Conversely, when a layer, area, or plate is referred to as being "directly below" another layer, area, or plate, intervening layers, areas, or plates may be absent therebetween.

The spatially relative terms "below," "beneath," "lower," "above," "upper," and the like, may be used herein for ease of description to describe relations between one element or component and another element or component as illustrated in the drawings. It is to be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in the other direction, and, thus, the spatially relative terms may be interpreted differently depending on the orientations.

Throughout the specification, when an element is referred to as being "connected" to another element, the element may be directly connected to the other element, or electrically connected to the other element with one or more intervening elements interposed therebetween. It is to be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

It is to be understood that, although the terms "first," "second," "third," and the like may be used herein to describe various elements, these elements should not be limited by these terms. These terms are used to distinguish one element from another element. Thus, "a first element" discussed below could be termed "a second element" or "a third element," and "a second element" and "a third element" may be termed likewise without departing from the teachings herein.

The terms "about" or "approximately" as used herein are inclusive of the stated value and means within an acceptable range of deviation for the particular value as determined by one of ordinary skill in the art, considering the measurement in question and the error associated with measurement of the particular quantity (i.e. the limitations of the measurement system). For example, "about" may mean within one or more standard deviations, or within ±30%, +20%, +10%, or ±5% of the stated value.

Unless otherwise defined, all terms used herein (including technical and scientific terms) have the same meaning as commonly understood by those skilled in the art to which the present invention pertains. It is to be further understood that terms, such as those defined in commonly used dictionaries, should be interpreted as having a meaning that is consistent with their meaning in the context of the relevant art and are not to be interpreted in an ideal or excessively formal sense unless clearly defined in the present specification.

Some of the parts which are not associated with the description may not be provided in order to specifically describe some exemplary embodiments of the present invention, and like reference numerals refer to like elements throughout the specification.

Figure 2:
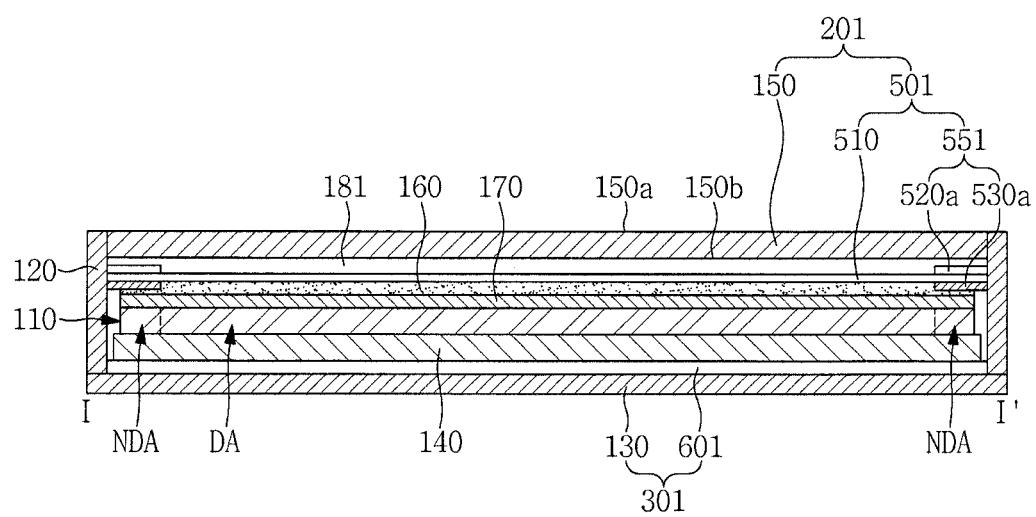
FIG. 2 is a cross-sectional view of the display device of FIG. 1, taken along the line I-I'.

FIG. 1 is a perspective view illustrating a display device 101 according to an exemplary embodiment; and FIG. 2 is a cross-sectional view taken along the line I-I' of FIG. 1.

The display device 101 illustrated in FIGS. 1 and 2 includes cover panels 201 and 301, a side support member 120, and a display panel 110.

The cover panels 201 and 301 include a window panel 201 on a side in which an image is displayed, and a back panel 301 on the opposite side from the side in which the image is displayed. The side support member 120 connects the two cover panels 201 and 301.

The display panel 110 is mounted on the back panel 301 together with a support portion 140. The support portion 140 may be, for example, a cushion member, but is not limited thereto. Elements for driving the display panel 110, such as a battery, for example, may be disposed on the support portion 140.

The display panel 110 includes a display area DA and a non-display area NDA. The display area DA is a portion where an image is displayed. The non-display area NDA may have a shape surrounding the display area DA, for example. The display panel 110 is, for example, a liquid crystal display ("LCD") panel, an organic light emitting diode ("OLED") display panel, or the like. The structure of the display panel 110 will be described further below.

Referring to FIG. 2, a touch panel 170 and an adhesive layer 160 may be disposed between the display panel 110 and the window panel 201.

Figure 3:
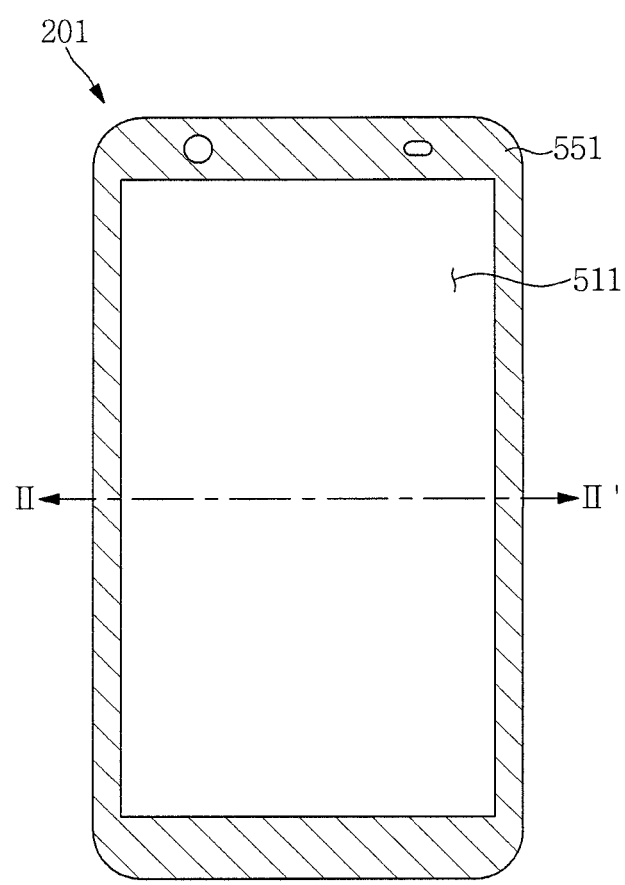
FIG. 3 is a plan view illustrating a window panel according to an exemplary embodiment.
Figure 4A:
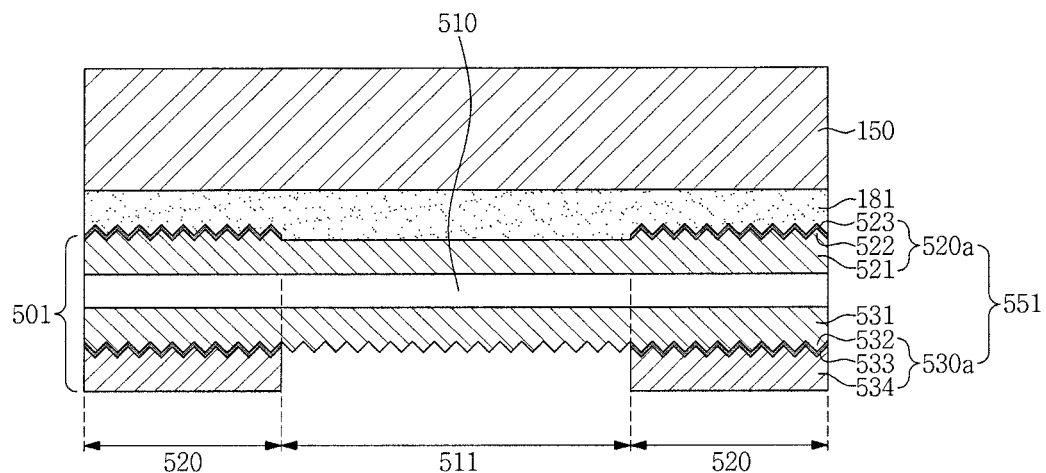
FIG. 4A is a cross-sectional view of the window panel of FIG. 3, taken along the line II-II'.
Figure 4B:
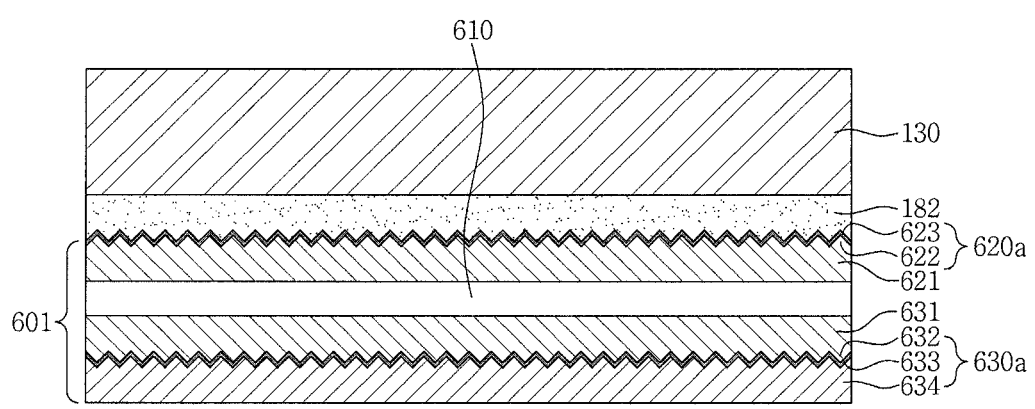
FIG. 4B is a cross-sectional view illustrating a back panel according to an exemplary embodiment.

FIG. 3 is a plan view illustrating the window panel 201 according to an exemplary embodiment; FIG. 4A is a cross-sectional view taken along the line II-II' of FIG. 3; and FIG. 4B is a cross-sectional view illustrating the back panel 301 according to an exemplary embodiment.

Referring to FIG. 4A, the window panel 201, which is one of the cover panels 201 and 301, includes a plate substrate 150, an adhesive layer 181 on the plate substrate 150, and a decoration film 501 on the adhesive layer 181.

The plate substrate 150 illustrated in FIG. 4A has light transmittance and may include a light transmitting member, such as glass, plastic, or the like. Referring to FIG. 2, the plate substrate 150 includes a first surface 150a and a second surface 150b. The first surface 150a of the plate substrate 150 faces toward the user and the second surface 150b faces toward the display panel 110.

In addition, the window panel 201 includes a bezel portion 551. The bezel portion 551 is disposed on the plate substrate 150 so as to overlap the non-display area NDA of the display panel 110. The bezel portion 551 is an opaque layer and blocks light. Accordingly, a bottom portion of the bezel portion 551 is not visible to the user. The window panel 201 has light transmittance at a portion overlapping the display area DA of the display panel 110.

The decoration film 501 includes a base film 510, a first decoration portion 520a on one surface of the base film 510, and a second decoration portion 530a on another surface of the base film 510.

Referring to FIG. 4A, the base film 510 has a light transmitting area 511 and a light blocking area 520, and the light transmitting area 511 of the base film 510 overlaps the display area DA of the display panel 110, and the light blocking area 520 overlaps the non-display area NDA of the display panel 110. The first decoration portion 520a and the second decoration portion 530a are disposed in the light blocking area 520.

The first decoration portion 520a includes a first concavo-convex portion 522 on at least a part of the base film 510. The second decoration portion 530a includes a second concavo-convex portion 532 disposed on at least a part of the base film 510 to correspond to the first concavo-convex portion 522.

According to an exemplary embodiment, the decoration film 501 includes at least one of a first deposition layer 523 on the first concavo-convex portion 522 and a second deposition layer 533 on the second concavo-convex portion 532.

Referring to FIG. 4A, in an embodiment, the first decoration portion 520a includes the first deposition layer 523 on the first concavo-convex portion 522, and the second decoration portion 530a includes the second concavo-convex portion 532 on the second deposition layer 533.

In addition, the decoration film 501 includes a first polymer resin layer 521 between the base film 510 and the first concavo-convex portions 522 and a second polymer resin layer 531 between the base film 510 and the second concavo-convex portions 532.

The first concavo-convex portion 522 and the second concavo-convex portion 532 may include a polymer resin. The first concavo-convex portion 522 and the second concavo-convex portion 532 may be formed by patterning the polymer resin. There is no limitation on the patterning method, and various known patterning methods may be applied. For example, the first concavo-convex portion 522 and the second concavo-convex portion 532 may be formed by an imprinting method.

In an embodiment, the first concavo-convex portion 522 may be formed integrally with the first polymer resin layer 521, and the second concavo-convex portion 532 may be formed integrally with the second polymer resin layer 531.

The first concavo-convex portion 522 and the second concavo-convex portion 532 may include a same or substantially same material or may include different materials. In an embodiment, the first concavo-convex portion 522 may have a refractive index in a range from about 1.7 to about 2.8, and the second concavo-convex portion 532 may have a refractive index in a range from about 1.7 to about 2.8.

The second deposition layer 533 may include a metal. The second deposition layer 533 may be formed of a metal, such as silver (Au), gold (Au), platinum (Pt), aluminum (Al), titanium (Ti), manganese (Mn), cobalt (Co), zinc (Zn), and the like.

The second deposition layer 533 may include at least one of, for example, a metal layer, a metal oxide layer, and a metal nitride layer.

The second deposition layer 533 reflects light. Since the second deposition layer 533 is formed on the second concavo-convex portion 532, light may be reflected in various directions at the second deposition layer 533.

According to an exemplary embodiment, the first deposition layer 523 is disposed on the first concavo-convex portion 522. The first deposition layer 523 has both light transmittance and light reflectivity. The first deposition layer 523 may include a metal as well as the second deposition layer 533.

Since light is doubly reflected and doubly interferes due to the first deposition layer 523 on the first concavo-convex portion 522 and the second deposition layer 533 on the second concavo-convex portion 532, various marks or patterns may be observed depending on the viewing angle of the user, and a hologram effect may be generated. Accordingly, the display device 101 may have a fine appearance.

The first deposition layer 523 and the second deposition layer 533 may have a substantially same color or different colors. Since light is reflected from both the first deposition layer 523 and the second deposition layer 533, a deep color may be expressed and a three-dimensional effect may be generated. In addition, a color mixture effect may be generated by the first deposition layer 523 and the second deposition layer 533.

In an embodiment, for light blocking, the second decoration portion 530a includes a light blocking print layer 534 on the second deposition layer 533. However, in a case in which the light blocking function of the second deposition layer 533 is excellent, the light blocking print layer 534 may be omitted.

The bezel portion 551 is formed by the first decoration portion 520a and the second decoration portion 530a. The bezel portion 551 blocks light and imparts color and aesthetics to the window panel 201.

FIG. 4B is a cross-sectional view illustrating the back panel 301 according to an exemplary embodiment.

The back panel 301, which is one of the cover panels 201 and 301, includes a plate substrate 130, an adhesive layer 182 on the plate substrate 130, and a decoration film 601 on the adhesive layer 182.

The decoration film 601 includes a base film 610, a first decoration portion 620a on one surface of the base film 610, and a second decoration portion 630a on another surface of the base film 610, overlapping the first decoration portion 620a.

The base film 610 may or may not have light transmittance.

The first decoration portion 620a includes a first concavo-convex portion 622 on one surface of the base film 610. In an embodiment, a first deposition layer 623 may be disposed on the first concavo-convex portion 622. According to an exemplary embodiment, the first decoration portion 620a is disposed toward the user.

The second decoration portion 630a includes a second concavo-convex portion 632 on another surface of the base film 610 and a second deposition layer 633 on the second concavo-convex portion 632.

Referring to FIG. 4B, in an embodiment, the first decoration portion 620a is disposed over an entire surface of one surface of the base film 610, and the second decoration portion 630a is disposed over an entire surface of another surface of the base film 610.

In addition, the decoration film 601 includes a first polymer resin layer 621 between the base film 610 and the first concavo-convex portion 622 and a second polymer resin layer 631 between the base film 610 and the second concavo-convex portion 632.

In an embodiment, the first concavo-convex portion 622 may be formed integrally with the first polymer resin layer 621, and the second concavo-convex portion 632 may be formed integrally with the second polymer resin layer 631.

In an embodiment, for light blocking, a light blocking print layer 634 is disposed on the second deposition layer 633 of the second decoration portion 630a.

Since light is doubly reflected and doubly interferes due to the first deposition layer 623 on the first concavo-convex portion 622 and the second deposition layer 633 on the second concavo-convex portion 632, various marks or patterns may be observed depending on the viewing angle of the user, and a hologram effect may be generated. Accordingly, the back panel 301 of the display device 101 may have a fine appearance.

Figure 4C:
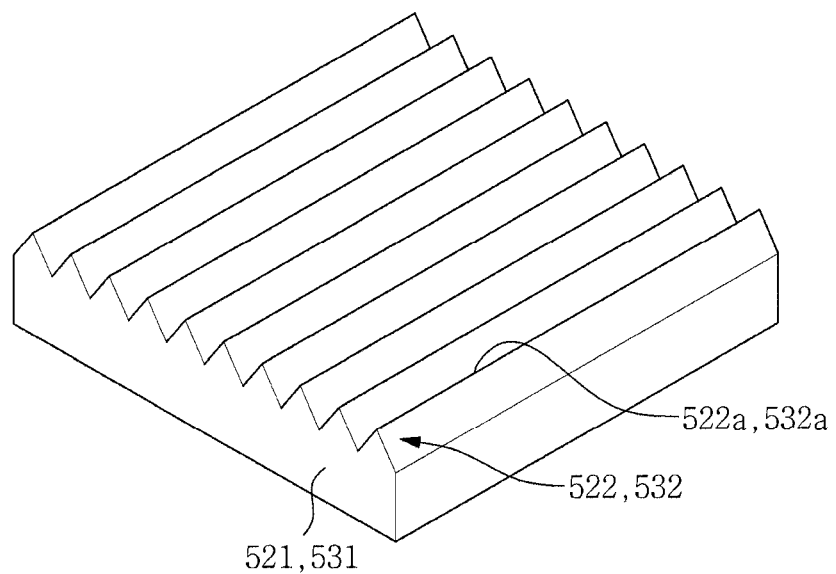
FIG. 4C is a perspective view illustrating a first concavo-convex portion and a second concavo-convex portion according to an exemplary embodiment.
Figure 4D:
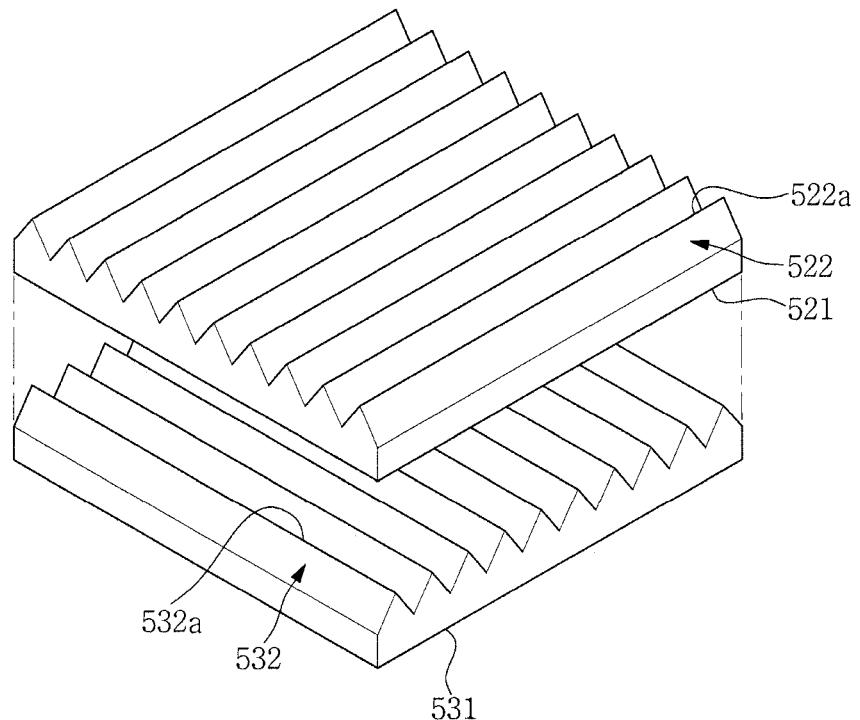
FIG. 4D is a perspective view illustrating a first concavo-convex portion and a second concavo-convex portion according to another exemplary embodiment.

FIG. 4C is a perspective view illustrating the first concavo-convex portion 522 and the second concavo-convex portion 532. FIG. 4D is a perspective view illustrating a first concavo-convex portion and a second concavo-convex portion according to another exemplary embodiment;

In an embodiment, the first concavo-convex portion 522 includes a plurality of first linear convex portions 522a spaced apart from each other, and, similarly, the second concavo-convex portion 532 includes a plurality of first linear convex portions 532a spaced apart from each other.

The first linear convex portion 522a constituting the first concavo-convex portion 522 and the second linear convex portion 532a constituting the second concavo-convex portion 532 may be parallel to each other. Alternatively, as shown in FIG. 4D, the first linear convex portion 522a constituting the first concavo-convex portion 522 and the second linear convex portion 532a constituting the second concavo-convex portion 532 may not be parallel to each other.

However, exemplary embodiments are not limited to the structures shown in FIG. 4C and FIG. 4D, and the first concavo-convex portion 522 and the second concavo-convex portion 532 may have any of various shapes, such as a columnar shape, a prismatic shape, a pyramid shape, and a hemispherical shape.

Figure 5A:
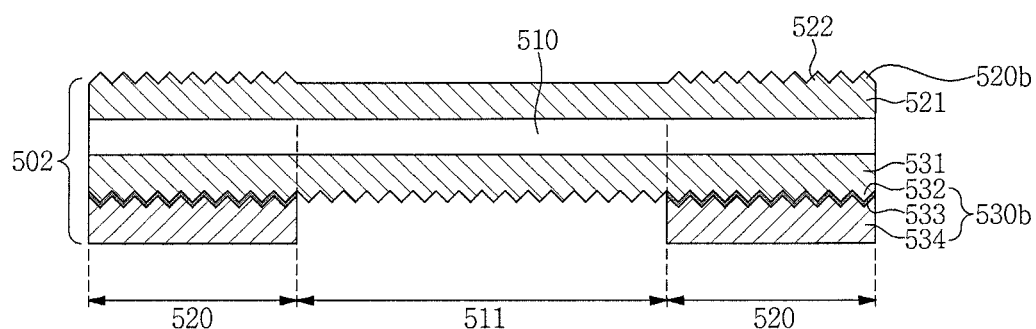
FIGS. 5A and 5B are cross-sectional views illustrating decoration films according to another exemplary embodiment.
Figure 5B:
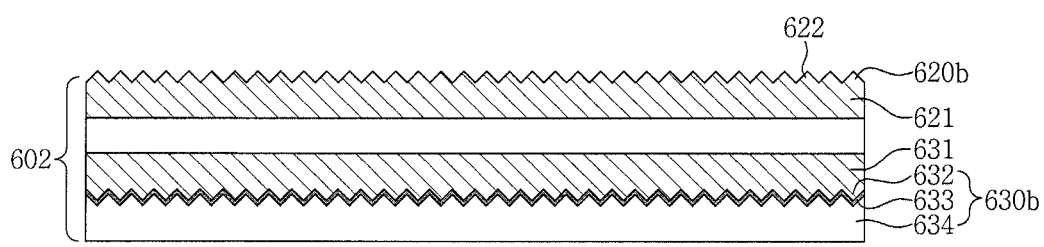

FIGS. 5A and 5B are cross-sectional views illustrating decoration films 502 and 602 according to another exemplary embodiment. Herein, in order to avoid duplication, further description of components already described will be omitted.

The decoration films 502 and 602 illustrated in FIGS. 5A and 5B do not include the first deposition layers 523 and 623 as compared to the decoration films 501 and 601 illustrated in FIGS. 4A and 4B.

Referring to FIG. 5A, in the decoration film 502 according to another exemplary embodiment, a first decoration portion 520b includes a first concavo-convex portion 522, and a second decoration portion 530b includes a second concavo-convex portion 532 and a second deposition layer 533 on the second concavo-convex portion 532.

The decoration film 502 of FIG. 5A may be attached to a plate substrate 150 and may be used as a component of a window panel 201. In such an exemplary embodiment, the first decoration portion 520b is disposed toward an adhesive layer 181. That is, the first decoration portion 520b may contact the adhesive layer 181.

The first concavo-convex portion 522 constituting the first decoration portion 520b has a refractive index greater than that of the adhesive layer 181. For example, the first concavo-convex portion 522 may have a refractive index greater than that of the adhesive layer 181 by about 0.3 or more. In an embodiment, the adhesive layer 181 may have a refractive index in a range from about 1.4 to about 1.6, and the first concavo-convex portion 522 may have a refractive index in a range from about 1.7 to about 2.8. For example, the first concavo-convex portion 522 may have a refractive index greater by about 0.3 to about 1.4 than that of the adhesive layer 181.

In the case in which the refractive index difference between the first concavo-convex portion 522 and the adhesive layer 181 is large, light is reflected and refracted smoothly at an interface between the first concavo-convex portion 522 and the adhesive layer 181.

Accordingly, a light reflected from the first concavo-convex portion 522 and the second deposition layer 533 interferes twice, and a light refracted by the first concavo-convex portion 522 may be reflected from the second deposition layer 533 once more. Accordingly, various marks or patterns may be observed depending on the viewing angle, and a hologram effect may be generated.

In addition, when the second deposition layer 533 has a color, light of a certain color may be viewed by the user.

Referring to FIG. 5B, the decoration film 602 according to another exemplary embodiment includes a first decoration portion 620b including a first concavo-convex portion 622, and a second decoration portion 630b including a second concavo-convex portion 632, and includes a second deposition layer 633 on the second concavo-convex portion 632.

The decoration film 602 of FIG. 5B may be attached to a plate substrate 130 of a back panel 301 to be used. In such an exemplary embodiment, the first decoration portion 620b may contact an adhesive layer 182.

Figure 6A:
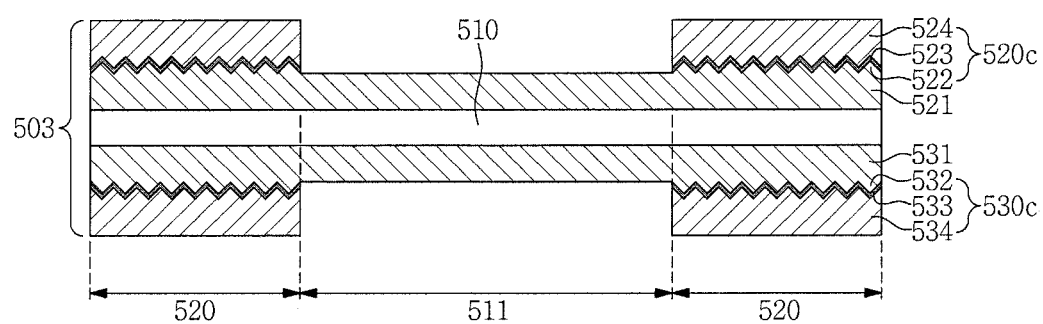
FIGS. 6A, 6B, 7A, 7B, 8A, 8B, 9A, 9B, 10A, 10B, 11A, and 11B are cross-sectional views illustrating decoration films according to additional exemplary embodiments.
Figure 6B:
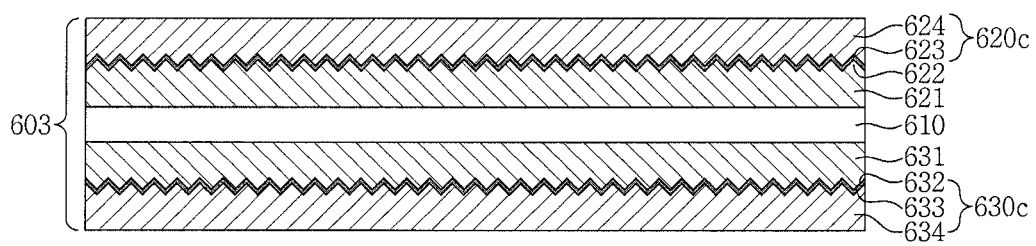

FIGS. 6A and 6B are cross-sectional views illustrating decoration films 503 and 603 according to another exemplary embodiment.

Referring to FIG. 6A, the decoration film 503 includes a first decoration portion 520c and a second decoration portion 530c, and the first decoration portion 520c of the decoration film 503 according to another exemplary embodiment includes a light transmitting print layer 524 on a first deposition layer 523. The light transmitting print layer 524 has light transmittance and may have any of various colors. In an embodiment, the light transmitting print layer 524 may include a pattern. The aesthetic sense of the decoration film 503 may be improved by the light transmitting print layer 524.

Referring to FIG. 6B, the decoration film 603 includes a first decoration portion 620c and a second decoration portion 630c, and the first decoration portion 620c of the decoration film 603 according to another exemplary embodiment includes a light transmitting print layer 624 on a first deposition layer 623. The light transmitting print layer 624 has light transmittance and may have any of various colors. In an embodiment, the light transmitting print layer 624 may include a pattern. The aesthetic sense of the decoration film 603 may be improved by the light transmitting print layer 624.

Figure 7A:
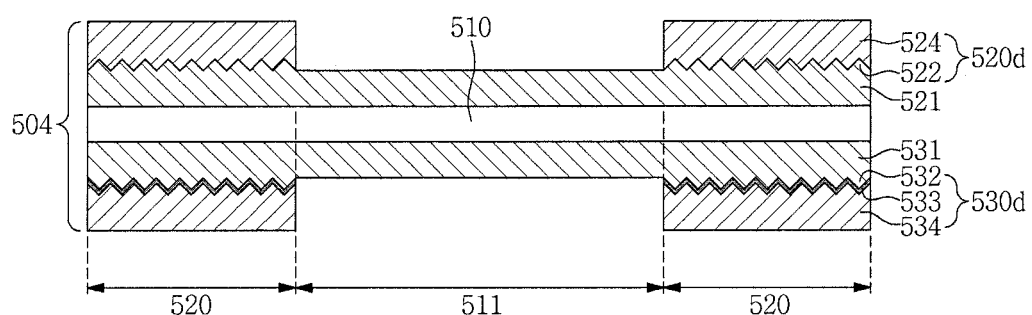
Figure 7B:
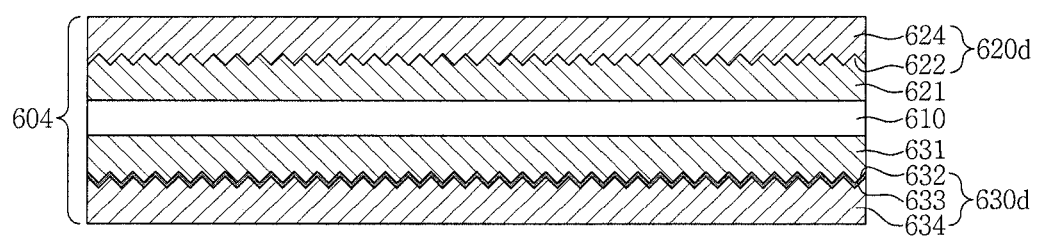

FIGS. 7A and 7B are cross-sectional views illustrating decoration films 504 and 604 according to another exemplary embodiment.

Referring to FIG. 7A, the decoration film 504 includes a first decoration portion 520d and a second decoration portion 530d, and the first decoration portion 520d of the decoration film 504 according to another exemplary embodiment does not include the first deposition layer 523 and includes a light transmitting print layer 524 on the first concavo-convex portion 522. The light transmitting print layer 524 has a refractive index different from that of the first concavo-convex portion 522. The light transmitting print layer 524 may have a refractive index greater than or less than that of the first concavo-convex portion 522. For example, the light transmitting print layer 524 and the first concavo-convex portion 522 may have a refractive index difference of about 0.3 or more. Accordingly, light is reflected and refracted at an interface between the light transmitting print layer 524 and the first concavo-convex portion 522, thereby improving the aesthetic sense of the decoration film 504.

Referring to FIG. 7B, the decoration film 604 includes a first decoration portion 620d and a second decoration portion 630d, and the first decoration portion 620d of the decoration film 604 according to another exemplary embodiment does not include the first deposition layer 623 and includes a light transmitting print layer 624 on the first concavo-convex portion 622. The light transmitting print layer 624 has a different refractive index from that of the first concavo-convex portion 622.

Figure 8A:
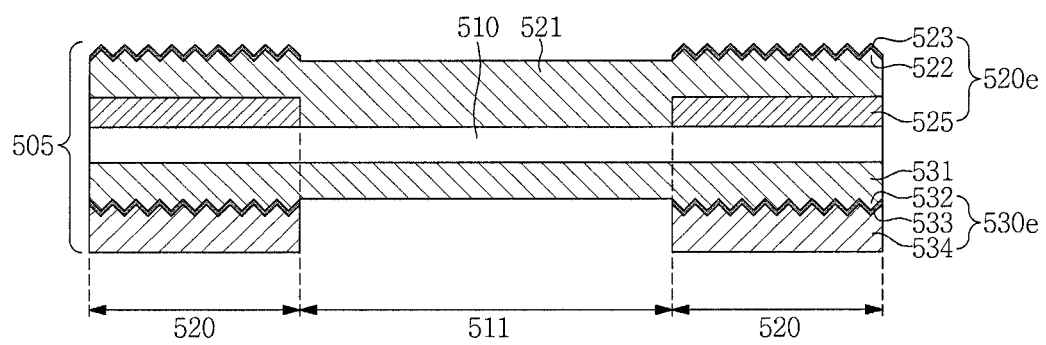
Figure 8B:
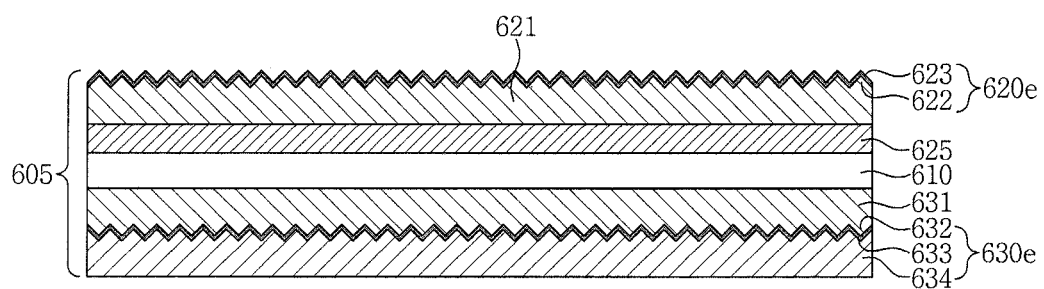

FIGS. 8A and 8B are cross-sectional views illustrating decoration films 505 and 605 according to another exemplary embodiment.

Referring to FIG. 8A, the decoration film 505 includes a first decoration portion 520e and a second decoration portion 530e, and the first decoration portion 520e of the decoration film 505 according to another exemplary embodiment includes a light transmitting print layer 525 between a base film 510 and a first concavo-convex part 522. The light transmitting print layer 525 is disposed below a first polymer resin layer 521.

The light transmitting print layer 525 has light transmittance and may have any of various colors. In an embodiment, the light transmitting print layer 525 may include a pattern. The aesthetic sense of the decoration film 505 may be improved by the light transmitting print layer 525.

Referring to FIG. 8B, the decoration film 605 includes a first decoration portion 620e and a second decoration portion 630e, and the first decoration portion 620e of the decoration film 605 according to another exemplary embodiment includes a light transmitting print layer 625 between a base film 610 and a first concavo-convex part 622. The light transmitting print layer 625 is disposed below a first polymer resin layer 621. The light transmitting print layer 625 may have any of various colors.

Figure 9A:
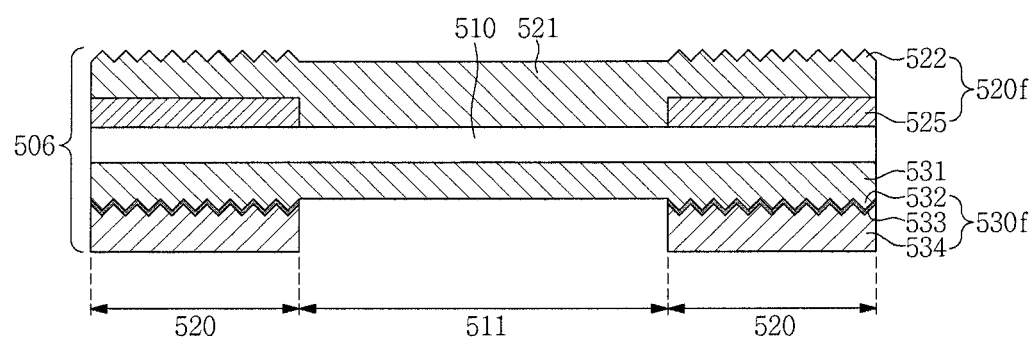
Figure 9B:
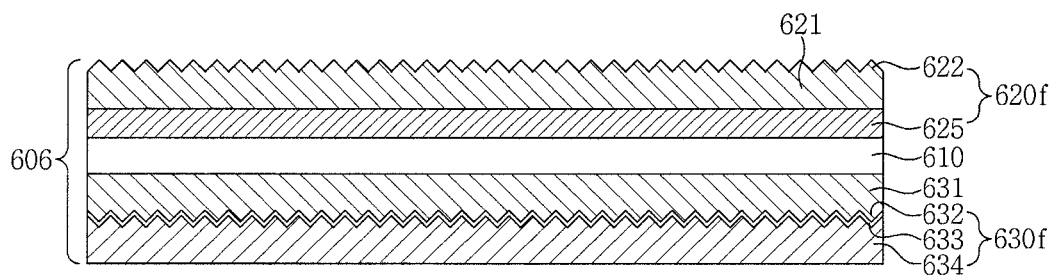

FIGS. 9A and 9B are cross-sectional views illustrating decoration films 506 and 606 according to another exemplary embodiment.

The decoration film 506 includes a first decoration portion 520f and a second decoration portion 530f. The decoration film 606 includes a first decoration portion 620f and a second decoration portion 630f. The decoration films 506 and 606 illustrated in FIGS. 9A and 9B do not include the first deposition layers 523 and 623 as compared to the decoration films 505 and 605 illustrated in FIGS. 8A and 8B.

Figure 10A:
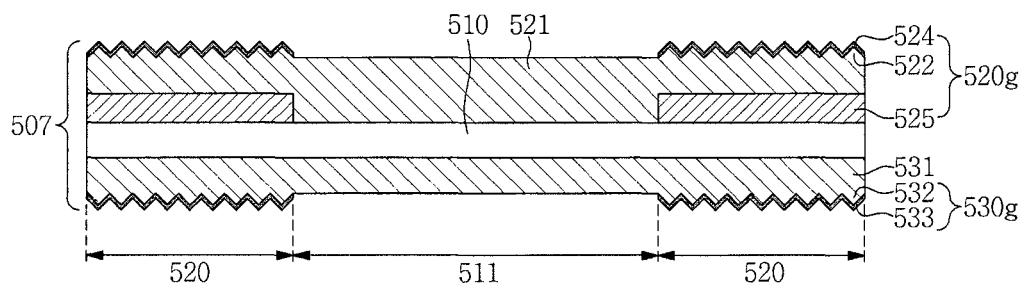
Figure 10B:
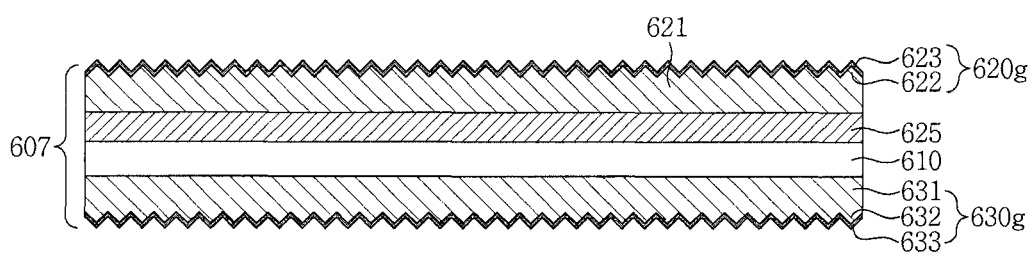

FIGS. 10A and 10B are cross-sectional views illustrating decoration films 507 and 607 according to another exemplary embodiment.

The decoration film 507 includes a first decoration portion 520g and a second decoration portion 530g. The decoration film 607 includes a first decoration portion 620g and a second decoration portion 630g. The decoration films 507 and 607 illustrated in FIGS. 10A and 10B do not include the light blocking print layers 534 and 634 as compared to the decoration films 505 and 605 illustrated in FIGS. 8A and 8B. In such an exemplary embodiment, light is blocked by second deposition layers 533 and 633. In an embodiment, for light blocking, the second deposition layers 533 and 633 may have a thickness of about 200 nm or more.

Figure 11A:
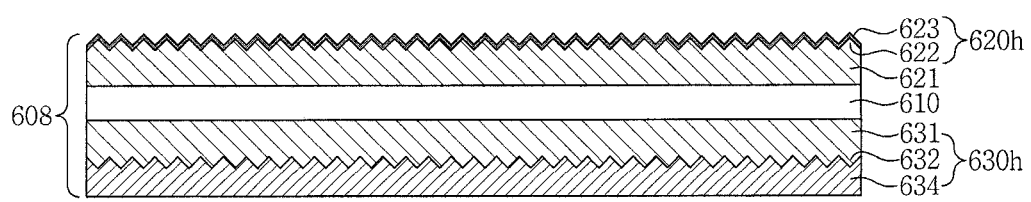
Figure 11B:
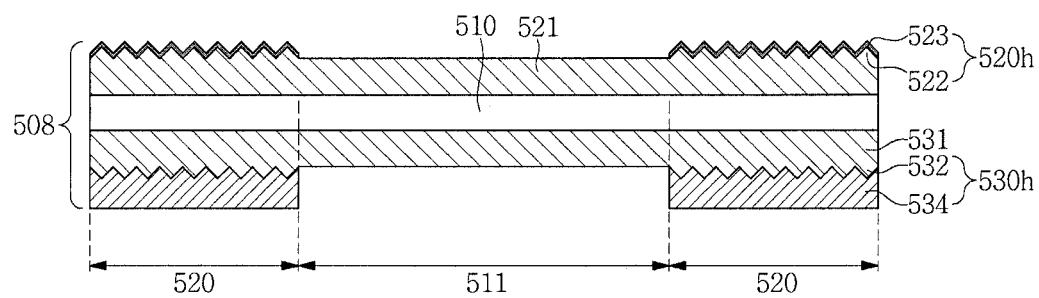

FIGS. 11A and 11B are cross-sectional views illustrating decoration films 508 and 608 according to another exemplary embodiment.

The decoration film 508 includes a first decoration portion 520h and a second decoration portion 530h. The decoration film 608 includes a first decoration portion 620h and a second decoration portion 630h. The decoration films 508 and 608 illustrated in FIGS. 11A and 11B do not include the second deposition layers 533 and 633 as compared to the decoration films 505 and 605 illustrated in FIGS. 8A and 8B. In such an exemplary embodiment, light is blocked by light blocking print layers 534 and 634. In addition, light is reflected from the second concavo-convex portions 532 and 632. Accordingly, interference between a light reflected by the second concavo-convex portions 532 and 632 and a light reflected by first deposition layers 523 and 623 may occur.

Herein, a method of manufacturing a decoration film according to an exemplary embodiment will be described.

The method of manufacturing a decoration film according to an exemplary embodiment includes forming the first concavo-convex portion 522 on one surface of the base film 510, forming the second concavo-convex portion 532 on another surface of the base film 510, and at least one of forming the first deposition layer 523 on the first concavo-convex portion 522 and forming the second deposition layer 533 on the second concavo-convex portion 532.

FIGS. 12A, 12B, 12C, 12D, 12E, 12F, 12G, 12H, 12I, 12J, 12K, 12L, and 12M are views illustrating a process of manufacturing a decoration film according to an exemplary embodiment.

According to an exemplary embodiment, the second decoration portion 530a may be formed after the first decoration portion 520a is formed on the base film 510, but, alternatively, the second decoration portion 530a may be formed first, and then the first decoration portion 520a may be formed.

FIGS. 12A, 12B, 12C, 12D, 12E, 12F, 12G, 12H, 12I, 12J, 12K, 12L, and 12M illustrate that the first decoration portion 520a is formed after the second decoration portion 530a is formed on the base film 510. However, exemplary embodiments are not limited thereto.

Figure 12A:
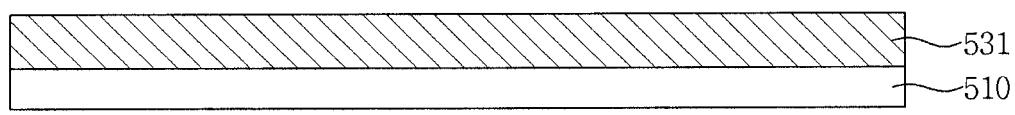
FIGS. 12A, 12B, 12C, 12D, 12E, 12F, 12G, 12H, 12I, 12J, 12K, 12L, and 12M are views illustrating a process of manufacturing a decoration film according to an exemplary embodiment.

Referring to FIG. 12A, a polymer resin is applied to another surface of the base film 510 to form the second polymer resin layer 531. In an embodiment, the second polymer resin layer 531 may include a thermocurable resin or a photocurable resin.

Figure 12B:
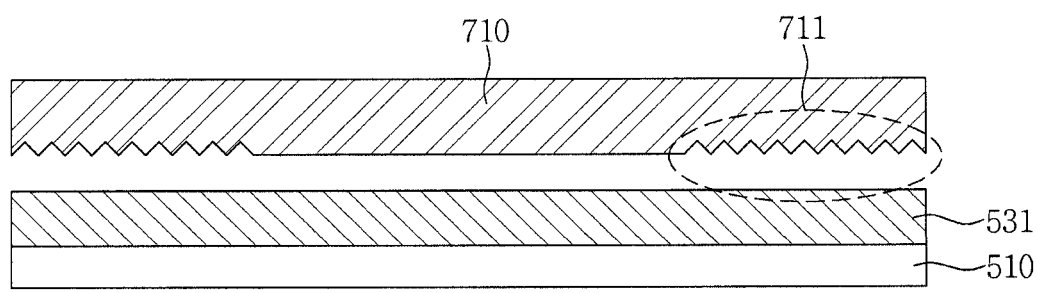

Referring to FIG. 12B, the second polymer resin layer 531 is pressed by an imprinter 710. The imprinter 710 includes a concavo-convex pattern 711. Accordingly, a pattern corresponding to the concavo-convex pattern 711 is formed on the second polymer resin layer 531.

Figure 12C:
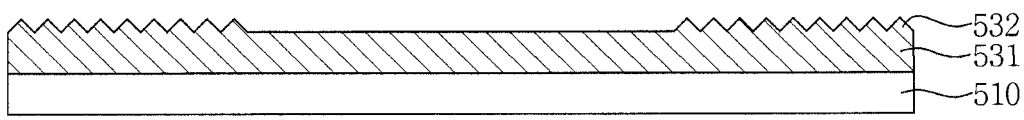

FIG. 12C illustrates the second concavo-convex portion 532 formed by pressurization using the imprinter 710. Subsequently, the second polymer resin layer 531 and the second concavo-convex portion 532 are cured. In such an exemplary embodiment, thermo-curing or photo-curing may be performed.

Figure 12D:
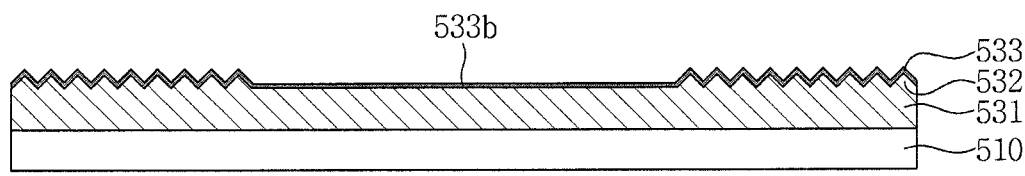

Referring to FIG. 12D, in an embodiment, deposition layers 533 and 533b are formed over an entire surface of the second polymer resin layer 531 including the second concavo-convex portion 532.

Figure 12E:
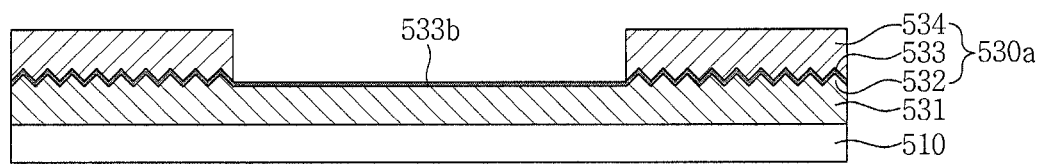

Referring to FIG. 12E, the light blocking print layer 534 is formed on a portion of the deposition layer overlapping the second concavo-convex portion 532.

Figure 12F:
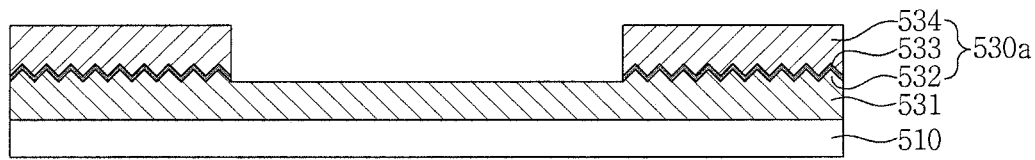

Referring to FIG. 12F, a portion of the deposition layer, that is, the deposition layer 533b, other than the deposition layer above the second concavo-convex portion 532 is removed, using the light blocking print layer 534 as a mask, such that the second deposition layer 533 is formed.

Figure 12G:
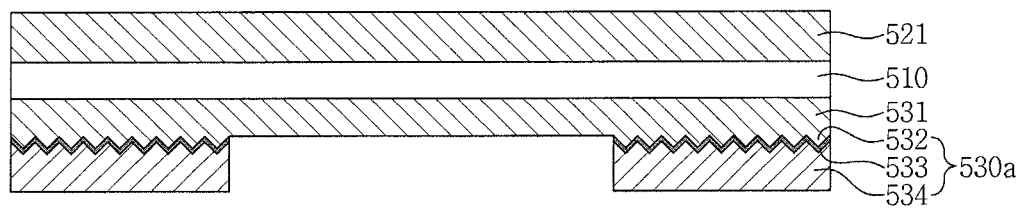

Referring to FIG. 12G, the first polymer resin layer 521 is formed on one surface of the base film 510. In an embodiment, the first polymer resin layer 521 may be formed of a thermocurable resin or a photocurable resin.

Figure 12H:
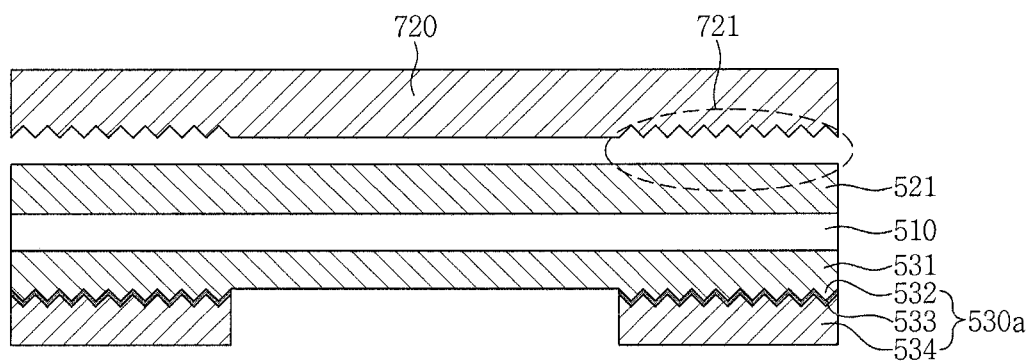

Referring to FIG. 12H, the first polymer resin layer 521 is pressed by an imprinter 720. The imprinter 720 has a concavo-convex pattern 721. Accordingly, a pattern corresponding to the concavo-convex pattern 721 is formed on the first polymer resin layer 521.

Figure 12I:
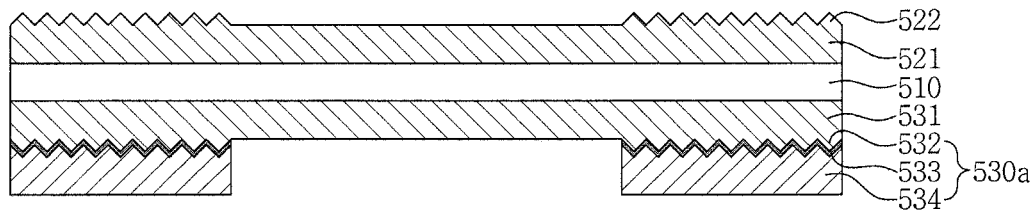

FIG. 12I illustrates the first concavo-convex portion 522 formed by pressurization using the imprinter 720. Subsequently, the first polymer resin layer 521 and the first concavo-convex portion 522 are cured. In such an exemplary embodiment, thermo-curing or photo-curing may be performed.

Figure 12J:
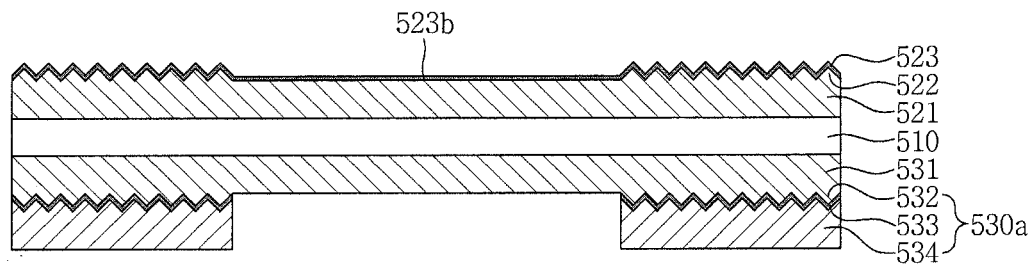

Referring to FIG. 12J, in an embodiment, deposition layers 523 and 523b are formed over an entire surface of the first polymer resin layer 521 including the first concavo-convex portion 522.

Figure 12K:
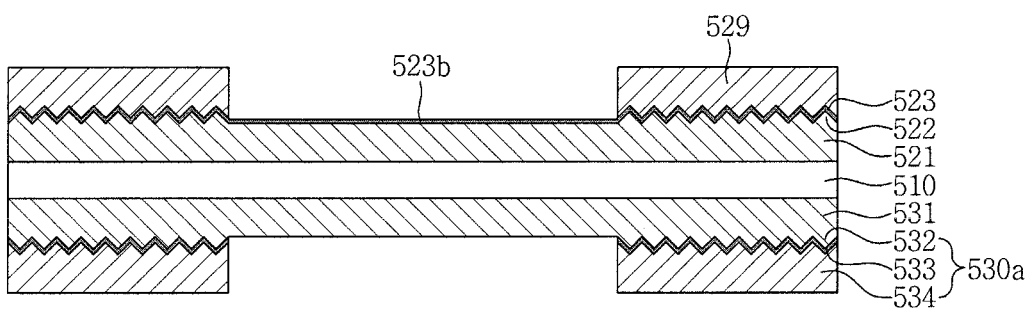

Referring to FIG. 12K, a mask 529 is formed above a portion of the deposition layer overlapping the first concavo-convex portion 522.

Figure 12L:
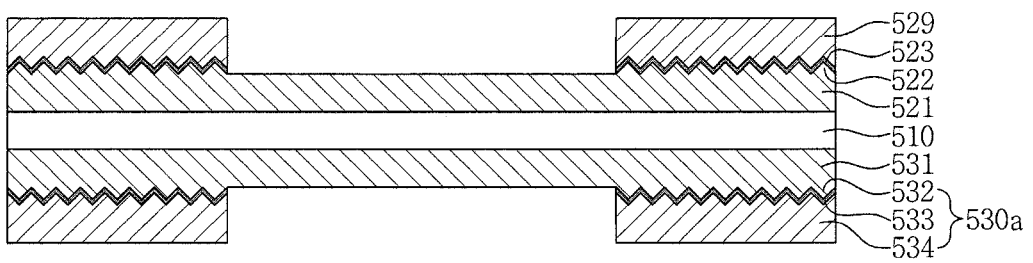

Referring to FIG. 12L, a portion of the deposition layer, that is, the deposition layer 523b, other than the deposition layer above the first concavo-convex portion 522 is removed such that the first deposition layer 523 is formed.

Figure 12M:
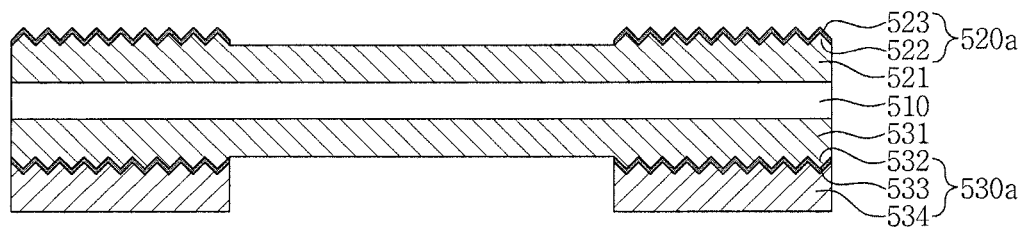

Referring to FIG. 12M, the mask 529 is removed such that a decoration film according to an exemplary embodiment is formed.

In an embodiment, in the case in which the light transmitting print layer 524 is formed on the first deposition layer 523, the decoration film 503 illustrated in FIG. 6A may be manufactured.

FIGS. 13A, 13B, 13C, 13D, 13E, 13F, 13G, and 13H are views illustrating a process of manufacturing a decoration film according to another exemplary embodiment.

Figure 13A:
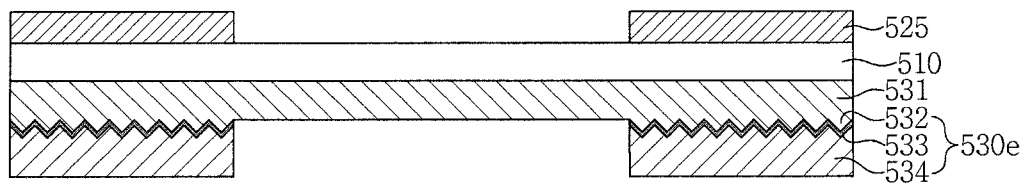
FIGS. 13A, 13B, 13C, 13D, 13E, 13F, 13G, and 13H are views illustrating a process of manufacturing a decoration film according to another exemplary embodiment.

Referring to FIG. 13A, after the second decoration portion 530e is formed on another surface of the base film 510, the light transmitting print layer 525 is formed on one surface of the base film 510.

Figure 13B:
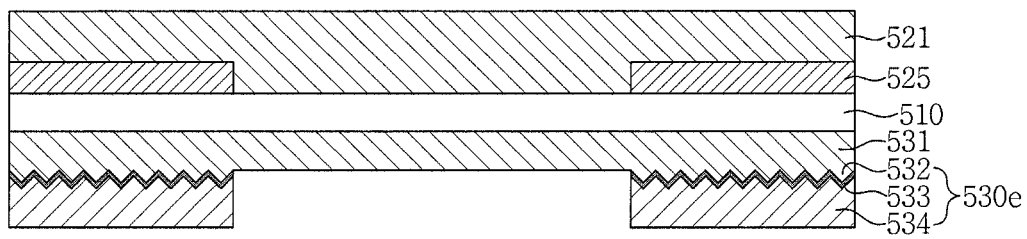

Referring to FIG. 13B, the first polymer resin layer 521 is formed on one surface of the base film 510 including the light transmitting print layer 525. In an embodiment, the first polymer resin layer 521 may include a thermo-curing resin or a photo-curing resin.

Figure 13C:
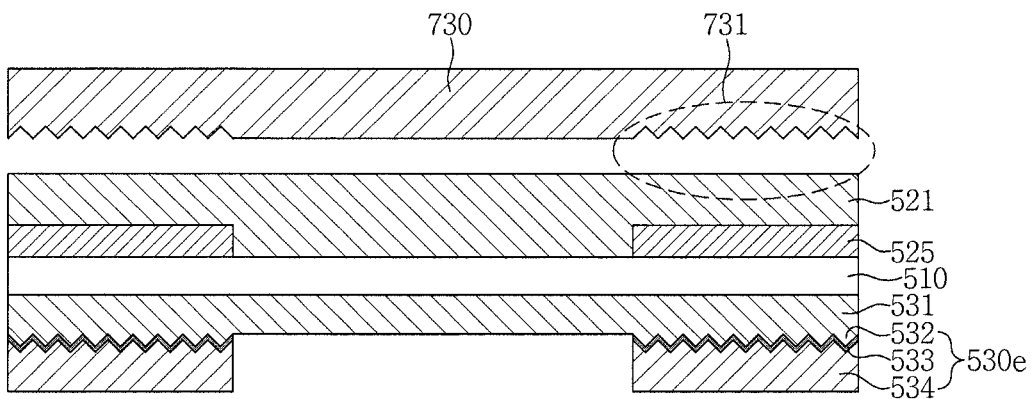

Referring to FIG. 13C, the first polymer resin layer 521 is pressed by an imprinter 730. The imprinter 730 has a concavo-convex pattern 731. Accordingly, a pattern corresponding to the concavo-convex pattern 731 is formed on the first polymer resin layer 521.

Figure 13D:
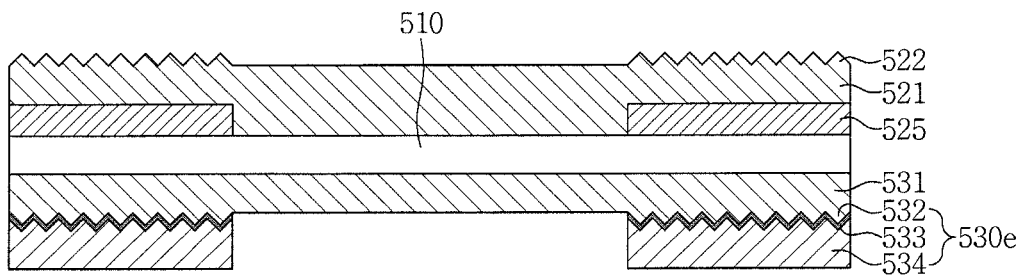

FIG. 13D illustrates the first concavo-convex portion 522 formed by pressurization using the imprinter 730. Subsequently, the first polymer resin layer 521 and the second concavo-convex portion 522 are cured. In such an exemplary embodiment, thermo-curing or photo-curing may be performed.

Figure 13E:
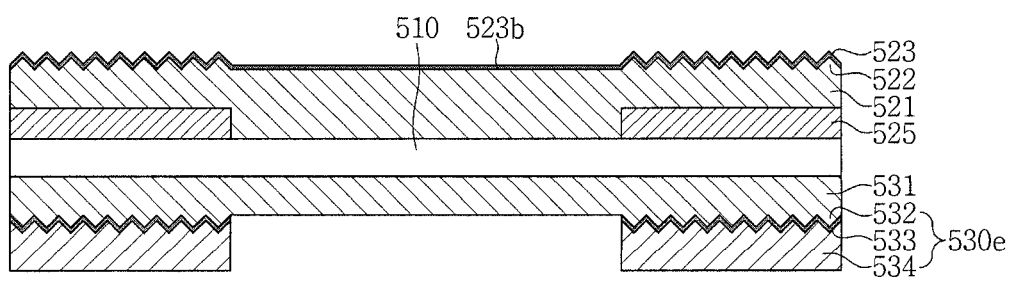

Referring to FIG. 13E, in an embodiment, deposition layers 523 and 523b are formed over an entire surface of the first polymer resin layer 521 including the first concavo-convex portion 522.

Figure 13F:
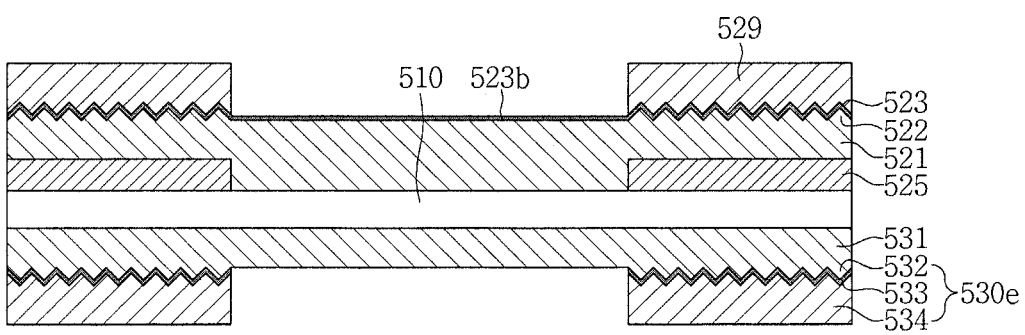

Referring to FIG. 13F, a mask 529 is formed above a portion of the deposition layer overlapping the first concavo-convex portion 522.

Figure 13G:
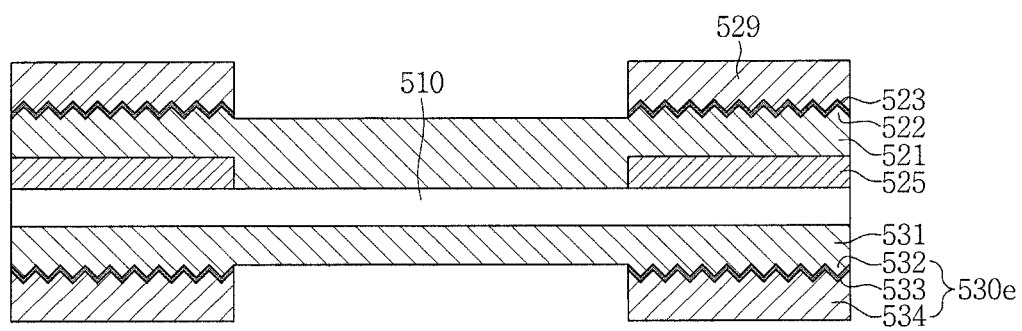

Referring to FIG. 13G, a portion 523b of the deposition layer, that is, the deposition layer 523b, other than the deposition layer above the first concavo-convex portion 522 is removed, such that the first deposition layer 523 is formed.

Figure 13H:
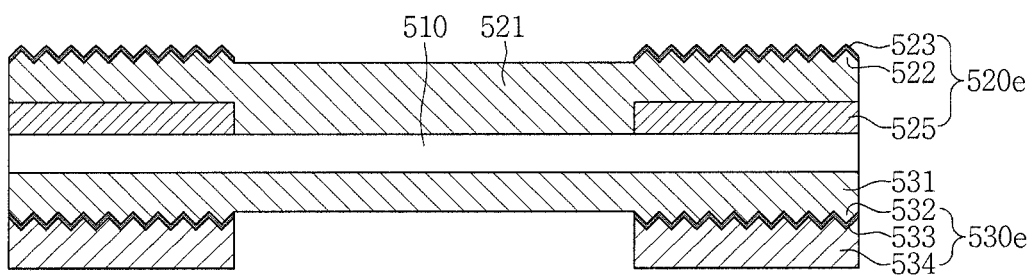

Referring to FIG. 13H, the mask 529 is removed such that the decoration film according to another exemplary embodiment may be formed.

Figure 14:
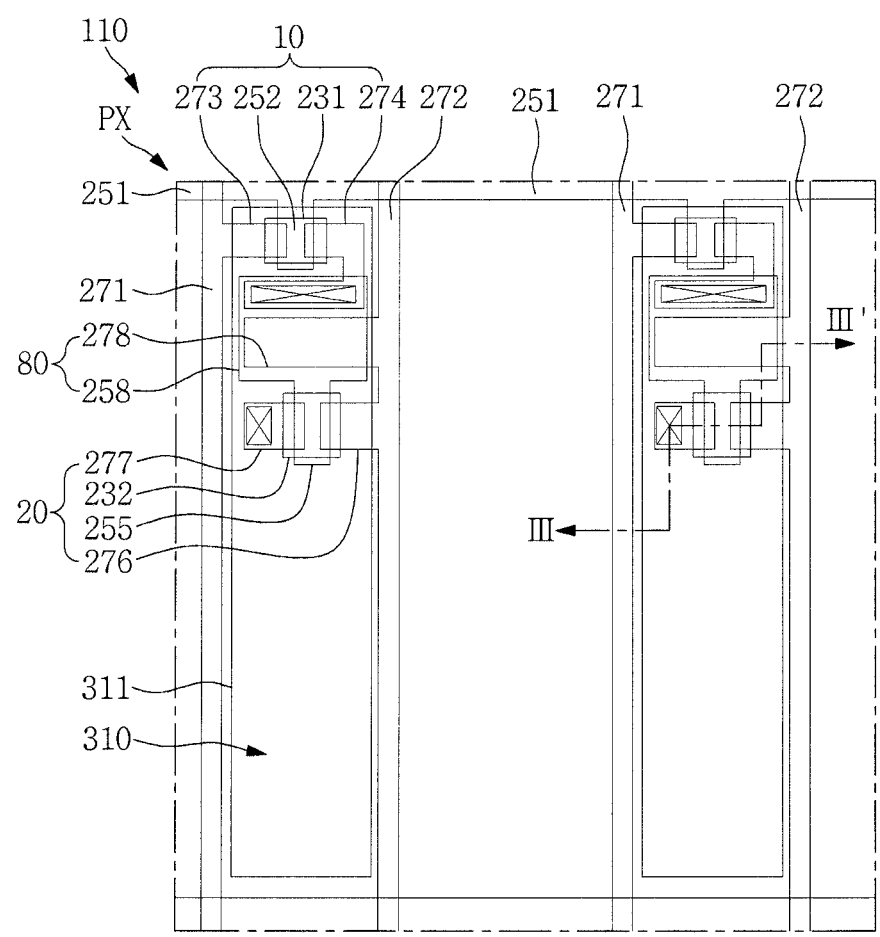
FIG. 14 is a plan view illustrating a pixel arrangement of a display panel according to an exemplary embodiment.
Figure 15:
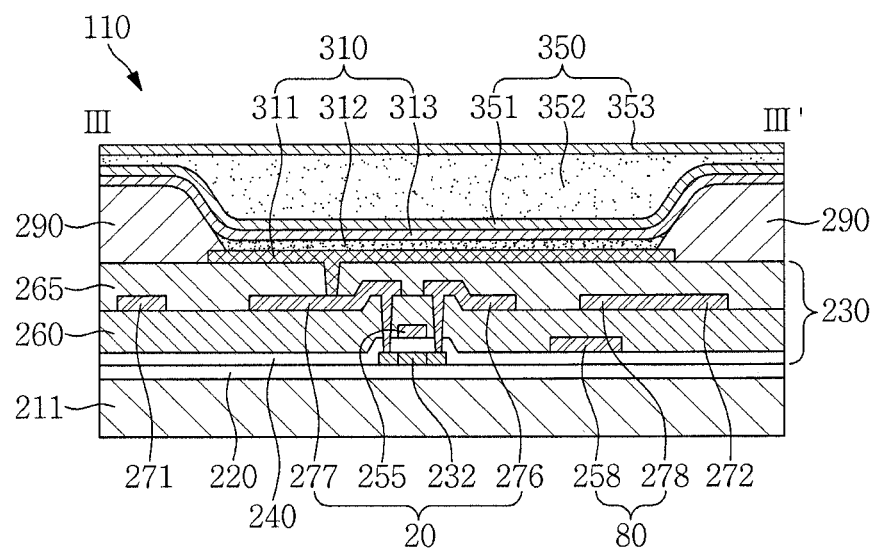
FIG. 15 is a cross-sectional view taken along the line III-III' of FIG. 14.

FIG. 14 is a plan view illustrating a pixel arrangement of the display panel 110 according to an exemplary embodiment; and FIG. 15 is a cross-sectional view taken along the line III-III' of FIG. 14.

As an example, the display panel 110 illustrated in FIGS. 14 and 15 is an organic light emitting diode ("OLED") display panel. The OLED display panel includes a first substrate 211, a driving circuit unit 230, and an OLED 310.

In an embodiment, the first substrate 211 may include an insulating material selected from the group consisting of: glass, quartz, ceramic, plastic, and the like. In an embodiment, a polymer film may be used as the first substrate 211.

A buffer layer 220 is on the first substrate 211. The buffer layer 220 may include one or more layers selected from any of various inorganic layers and organic layers. In another embodiment, the buffer layer 220 may be omitted.

The driving circuit unit 230 is disposed on the buffer layer 220. The driving circuit unit 230 includes a plurality of thin film transistors ("TFTs") 10 and 20 and drives the OLED 310. That is, the OLED 310 emits light according to a driving signal applied from the driving circuit unit 230, such that an image may be displayed.

FIGS. 14 and 15 illustrate an active matrix-type organic light emitting diode ("AMOLED") display panel having a 2Tr-1Cap structure. For example, the 2Tr-1Cap structure may include two TFTs, e.g., a switching TFT 10 and a driving TFT 20, and one capacitor 80 in each pixel, but exemplary embodiments are not limited thereto. For example, the OLED display panel may include three or more TFTs and two or more capacitors in each pixel, and may further include additional wirings. Herein, the term "pixel" refers to a smallest unit for displaying an image, and the OLED display panel displays an image using a plurality of pixels.

Each pixel PX includes the switching TFT 10, the driving TFT 20, the capacitor 80, and the OLED 310. In addition, a gate line 251 extending along one direction, and a data line 271 and a common power line 272 insulated from and intersecting the gate line 251 are also provided at the driving circuit unit 230. Each pixel PX may be defined by the gate line 251, the data line 271, and the common power line 272 as a boundary, but exemplary embodiments are not limited thereto. The pixels PX may be defined by a pixel defining layer 290 or a black matrix.

The OLED 310 includes a first electrode 311, an organic light emitting layer 312 on the first electrode 311, and a second electrode 313 on the organic light emitting layer 312. The organic light emitting layer 312 includes a low molecular weight organic material or a high molecular weight organic material. Holes and electrons are injected into the organic light emitting layer 312 from the first electrode 311 and the second electrode 313, respectively, and combined therein to form an exciton. The OLED 310 emits light when the exciton falls from an excited state to a ground state.

The capacitor 80 includes a pair of capacitor plates 258 and 278, having an insulating interlayer 260 interposed therebetween. In such an exemplary embodiment, the insulating interlayer 260 may be a dielectric element. A capacitance of the capacitor 80 is determined by electric charges accumulated in the capacitor 80 and a voltage across the pair of capacitor plates 258 and 278.

The switching TFT 10 includes a switching semiconductor layer 231, a switching gate electrode 252, a switching source electrode 273, and a switching drain electrode 274. The driving TFT 20 includes a driving semiconductor layer 232, a driving gate electrode 255, a driving source electrode 276, and a driving drain electrode 277. A gate insulating layer 240 is further provided to insulate the semiconductor layers 231 and 232 and the gate electrodes 252 and 255.

The switching TFT 10 may function as a switching element which selects a pixel to perform light emission. The switching gate electrode 252 is connected to the gate line 251, and the switching source electrode 273 is connected to the data line 271. Spaced apart from the switching source electrode 273, the switching drain electrode 274 is connected to one of the capacitor plates, e.g., the capacitor plate 258.

The driving TFT 20 applies a driving power, which allows an organic light emitting layer 312 of an OLED 310 in a selected pixel to emit light, to the first electrode 311 which is a pixel electrode. The driving gate electrode 255 is connected to said one capacitor plate 258 that is connected to the switching drain electrode 274. Each of the driving source electrode 276 and the other of the capacitor plates, e.g., the capacitor plate 278, is connected to the common power line 272. The driving drain electrode 277 is connected to the first electrode 311 of the OLED 310 through a contact hole defined in a planarization layer 265.

With the above-described structure, the switching TFT 10 is driven based on a gate voltage applied to the gate line 251 and serves to transmit a data voltage applied to the data line 271 to the driving TFT 20. A voltage equivalent to a difference between a common voltage applied to the driving TFT 20 from the common power line 272 and the data voltage transmitted by (or from) the switching TFT 10 is stored in the capacitor 80, and a current corresponding to the voltage stored in the capacitor 80 flows to the OLED 310 through the driving TFT 20 such that the OLED 310 may emit light.

The first electrode 311 may be a transmissive electrode having light transmittance or a reflective electrode having light reflectivity. The second electrode 313 may include a semi-transmissive layer or a reflective layer.

In an embodiment, referring to FIG. 15, the first electrode 311 is a reflective electrode, and the second electrode 313 is a semi-transmissive electrode. A light generated in the organic light emitting layer 312 is emitted through the second electrode 313. However, exemplary embodiments are not limited thereto. For example, the first electrode 311 may be a light transmissive electrode, the second electrode 313 may be a reflective electrode, and a light generated in the organic light emitting layer 312 may be emitted through the first electrode 311.

At least one of a hole injection layer ("HIL") and a hole transporting layer ("HTL") may further be provided between the first electrode 311 and the organic light emitting layer 312, and at least one of an electron transporting layer ("ETL") and an electron injection layer ("EIL") may further be provided between the organic light emitting layer 312 and the second electrode 313. The organic light emitting layer 312, the hole injection layer, the hole transporting layer, the electron transporting layer, and the electron injection layer may include an organic material, and thus may be referred to as an organic layer.

The pixel defining layer 290 has an opening. The opening of the pixel defining layer 290 exposes a portion of the first electrode 311. The organic light emitting layer 312 and the second electrode 313 are sequentially stacked on the first electrode 311 exposed from the pixel defining layer 290. In such an exemplary embodiment, the second electrode 313 may also be formed on the pixel defining layer 290 as well as on the organic light emitting layer 312. The OLED 310 emits light from the organic light emitting layer 312 in the opening of the pixel defining layer 290. As such, the pixel defining layer 290 may define a light emission area.

In an embodiment, a capping layer (not illustrated) may be provided on the second electrode 313 to protect the OLED 310 from an external environment.

Referring to FIG. 15, a thin film encapsulation layer 350 is disposed on the second electrode 313.

In an embodiment, the thin film encapsulation layer 350 includes one or more inorganic layers 351 and 353 and at least one organic layer 352, and prevents or substantially prevents outside air such as moisture or oxygen from permeating into the OLED 310.

The thin film encapsulation layer 350 may have a structure in which the inorganic layers 351 and 353 and the organic layer 352 are alternately stacked. In FIG. 15, the thin film encapsulation layer 350 includes two inorganic layers 351 and 353 and one organic layer 352, but the structure of the thin film encapsulation layer 350 is not limited thereto.

In an embodiment, each of the inorganic layers 351 and 353 may include one or more inorganic materials of: $Al_2O_3$, $TiO_2$, $ZrO$, $SiO_2$, $AlON$, $AlN$, $SiON$, $Si_3N_4$, $ZnO$, and $Ta_2O_5$. The inorganic layers 351 and 353 may be formed through methods such as a chemical vapor deposition (CVD) method or an atomic layer deposition (ALD) method. However, exemplary embodiments are not limited thereto, and the inorganic layers 351 and 353 may be formed using any of various methods known to those skilled in the art.

In an embodiment, the organic layer 352 may include a polymer-based material. Examples of the polymer-based material may include, for example, an acrylic resin, an epoxy resin, polyimide, and polyethylene. In addition, the organic layer 352 may be formed through a thermal deposition process. The thermal deposition process for forming the organic layer 352 may be performed in a temperature range that may not damage the OLED 310. However, exemplary embodiments are not limited thereto, and the organic layer 352 may be formed using any of various methods known to those skilled in the pertinent art.

The inorganic layers 351 and 353 which have a high density of thin layer may prevent or efficiently reduce infiltration of, mostly, moisture or oxygen. Permeation of moisture and oxygen into the OLED 310 may be prevented or largely prevented by the inorganic layers 351 and 353.

Moisture and oxygen that have passed through the inorganic layers 351 and 353 may further be blocked by the organic layer 352. The organic layer 352 may also serve as a buffer layer to reduce stress among respective ones of the inorganic layers 351 and 353, in addition to the moisture-infiltration preventing function. Further, since the organic layer 352 has planarization characteristics, an uppermost surface of the thin film encapsulation layer 350 may be planarized by the organic layer 352.

The thin film encapsulation layer 350 may have a small thickness. Accordingly, the OLED display panel may also have a small thickness. By applying the thin film encapsulation layer 350 in such a manner, the OLED display panel may have flexible characteristics.

Figure 16:
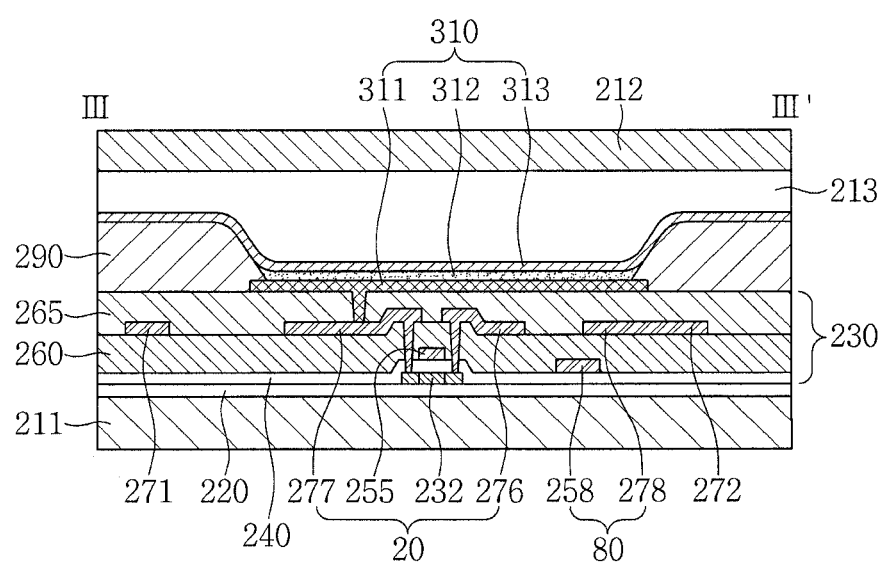
FIG. 16 is a cross-sectional view illustrating a portion of a display panel according to another exemplary embodiment.

FIG. 16 is a cross-sectional view illustrating a display panel according to another exemplary embodiment.

Referring to FIG. 16, a second substrate 212 is disposed on a second electrode 313 to protect an OLED 310. The second substrate 212 serves to seal the OLED 310 together with a first substrate 211. The second substrate 212, similar to the first substrate 211, may include an insulating material selected from the group consisting of: glass, quartz, ceramic, plastic, and the like. In an embodiment, a filler 213 may be disposed between the OLED 310 and the second substrate 212.

Figure 17:
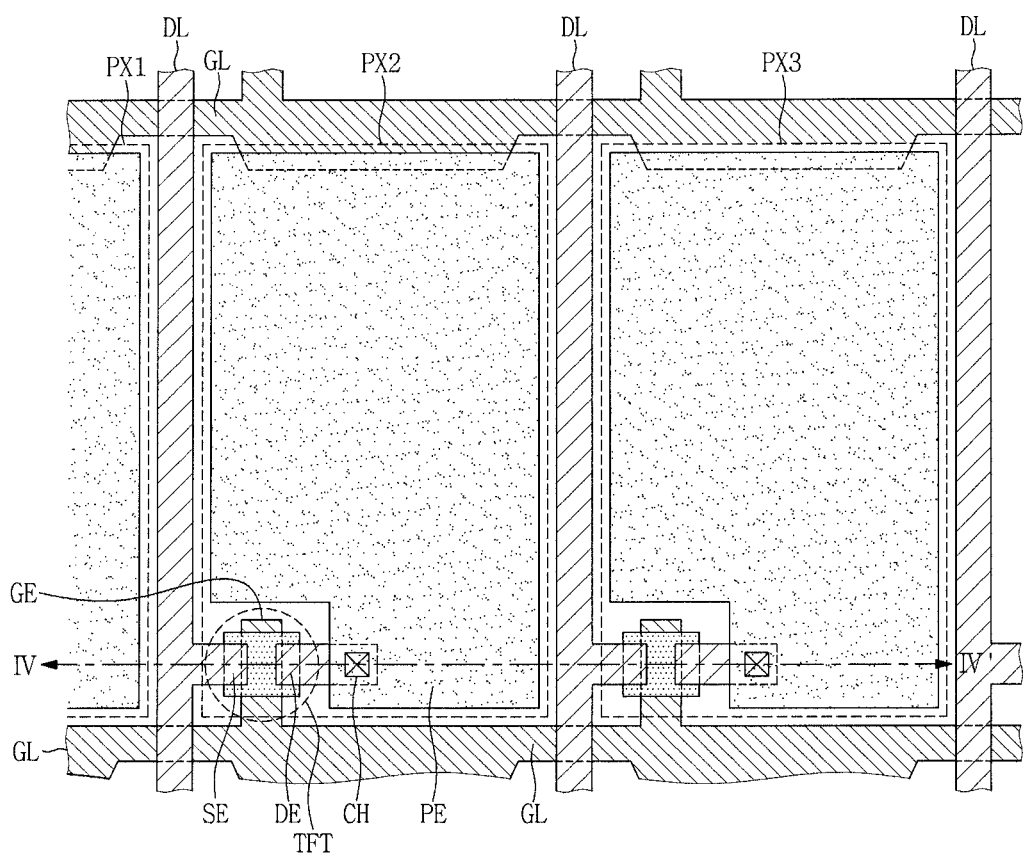
FIG. 17 is a plan view illustrating a pixel arrangement of a display panel according to another exemplary embodiment.
Figure 18:
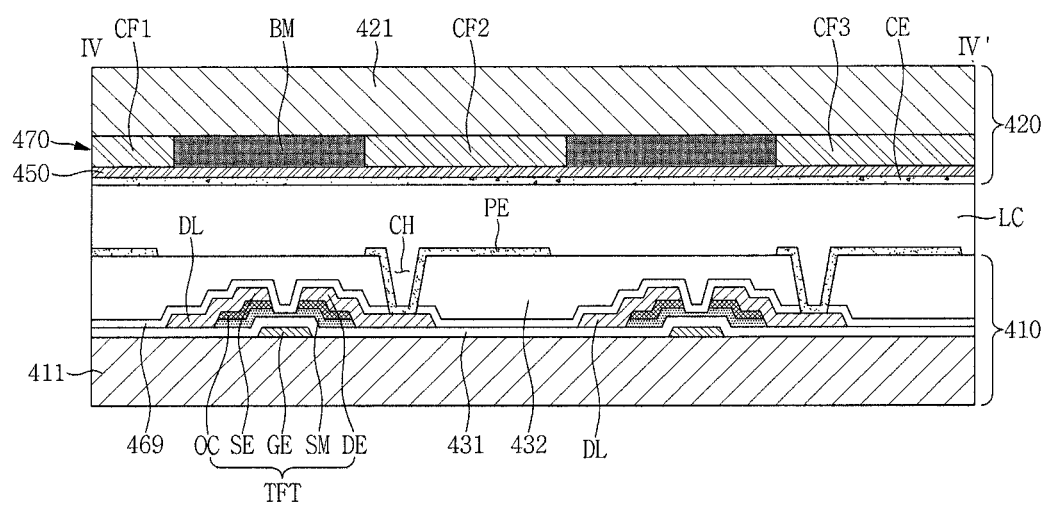
FIG. 18 is a cross-sectional view taken along the line IV-IV' of FIG. 17.

FIG. 17 is a plan view illustrating a pixel arrangement of a display panel according to another exemplary embodiment; and FIG. 18 is a cross-sectional view taken along the line IV-IV' of FIG. 17. FIGS. 17 and 18 illustrate an LCD panel as an exemplary embodiment.

The LCD panel illustrated in FIGS. 17 and 18 includes a display substrate 410, an opposing substrate 420, and a liquid crystal layer LC between the display substrate 410 and the opposing substrate 420.

The display substrate 410 includes a first substrate 411, a TFT, a pixel electrode PE, a gate insulating layer 431 and a protective layer 432. The TFT includes a semiconductor layer SM, an ohmic contact layer OC, a gate electrode GE, a source electrode SE, and a drain electrode DE.

The first substrate 411 may include a transparent material, such as glass or plastic.

A plurality of gate lines GL and gate electrodes GE are on the first substrate 411. The gate electrode GE is connected to the gate line GL. The gate line GL and the gate electrode GE may include or be formed of one of: aluminum (Al) or alloys thereof, silver (Ag) or alloys thereof, copper (Cu) or alloys thereof, molybdenum (Mo) or alloys thereof, chromium (Cr), tantalum (Ta), and/or titanium (Ti). At least one of the gate line GL and the gate electrode GE may have a multi-layer structure including at least two conductive layers that have different physical properties.

In an embodiment, the gate insulating layer 431 is disposed over an entire surface of the first substrate 411 including the gate line GL and the gate electrode GE. In an embodiment, the gate insulating layer 431 may include silicon nitride ($SiN_x$) or silicon oxide ($SiO_x$). In addition, the gate insulating layer 431 may have a multilayer structure including at least two insulating layers having different physical properties.

The semiconductor layer SM is on the gate insulating layer 431. In such an exemplary embodiment, the semiconductor layer SM overlaps the gate electrode GE below the gate insulating layer 431. The semiconductor layer SM may include amorphous silicon, polycrystalline silicon, or the like. The semiconductor layer SM may include an oxide semiconductor.

The ohmic contact layer OC is disposed on the semiconductor layer SM. For example, the ohmic contact layer OC is on the semiconductor layer SM other than a channel area.

Further, a plurality of data lines DL are on the gate insulating layer 431. The data line DL intersects the gate line GL. The source electrode SE is connected to the data line DL, and is on the ohmic contact layer OC. The drain electrode DE, spaced apart from the source electrode SE, is on the ohmic contact layer OC and connected to the pixel electrode PE.

At least one of the data line DL, the source electrode SE, and the drain electrode DE may include or be formed of a refractory metal, such as molybdenum, chromium, tantalum, and titanium, or an alloy thereof. Further, at least one of the data line DL, the source electrode SE and the drain electrode DE may have a multilayer structure including a refractory metal layer and a low-resistance conductive layer.

In an embodiment, an insulating interlayer 469 is disposed over the entire surface of the first substrate 411 including the gate insulating layer 431, the semiconductor layer SM, the data line DL, the source electrode SE, and the drain electrode DE. The insulating interlayer 469 may include an insulating material and, in particular, may protect the channel area, an exposed portion, of the semiconductor layer SM.

The protective layer 432 is disposed on the insulating interlayer 469. The protective layer 432 serves to planarize an upper portion the TFT. Accordingly, the protective layer 432 may also be referred to as a flattening layer.

The protective layer 432 may include an inorganic insulating material, such as silicon nitride (SiNx) or silicon oxide (SiOx). In another embodiment, the protective layer 432 may include an organic layer. In another embodiment, the protective layer 432 may have a double-layer structure including a lower inorganic layer and an upper organic layer.

The pixel electrode PE is on the protective layer 432. In such an exemplary embodiment, the pixel electrode PE is connected to the drain electrode DE through a contact hole CH defined through the protective layer 432 and the insulating interlayer 469. In an embodiment, the pixel electrode PE may include a transparent conductive material, such as indium tin oxide (ITO) or indium zinc oxide (IZO).

The opposing substrate 420 includes a second substrate 421, a color filter layer 470, and a common electrode CE.

The second substrate 421 includes transparent materials such as glass or plastic.

A light blocking portion BM is disposed on the second substrate 421. The light blocking portion BM has a plurality of openings. The openings are defined corresponding to respective pixel electrodes PE of first, second, and third pixels PX1, PX2, and PX3. The light blocking portion BM blocks light in portions other than the openings. For example, the light blocking portion BM is on the TFT, the gate line GL, and the data line DL to block light from passing therethrough and being directed outward. In another embodiment, the light blocking portion BM may not be invariably necessary, and may be omitted.

The color filter layer 470 is on the second substrate 421 and selectively blocks a wavelength of a light incident from a backlight unit (not illustrated).

The color filter layer 470 may include a first color filter CF1, a second color filter CF2, and a third color filter CF3.

The first, second, and third color filters CF1, CF2, and CF3 may be distinguished from each other by the light blocking portion BM. Referring to FIGS. 17 and 18, respective ones of the color filters CF1, CF2, and CF3 may be disposed so as to overlap the pixels PX1, PX2, and PX3. The first, second, and third color filters CF1, CF2, and CF3 may represent any one of red, green, and blue colors. The color filter layer 470 may include a white color filter (not illustrated) and may include a color filter having a color other than red, green, and blue.

A passivation layer 450 may be between the color filter layer 470 and the common electrode CE. In another embodiment, the passivation layer 450 may be omitted.

The common electrode CE is disposed on the passivation layer 450. In an embodiment, for example, the common electrode CE may be disposed over an entire surface of the second substrate 421. The common electrode CE may include a transparent conductive material, such as ITO or IZO.

The common electrode CE, along with the pixel electrode PE, applies an electric field over the liquid crystal layer LC.

Although not illustrated, a lower alignment layer may be on the pixel electrode PE. The lower alignment layer may be a vertical alignment layer, and may include a photoreactive material. Similar to the lower alignment layer, although not illustrated, an upper alignment layer may be on the common electrode CE. The upper alignment layer may include a substantially same material as that included in the lower alignment layer.

When facing surfaces of the first substrate 411 and the second substrate 421 are defined as upper surfaces of the corresponding substrates, and surfaces on opposite sides of the upper surfaces are respectively defined as lower surfaces of the corresponding substrates, polarizers may be on the lower surface of the first substrate 411 and the lower surface of the second substrate 421, respectively.

As set forth herein, according to one or more exemplary embodiments, since the decoration film includes the first decoration portion and the second decoration portion, a light reflected from the decoration film doubly interferes. Accordingly, various marks or patterns may be observed depending on the viewing angle of the user, and a hologram effect may be generated. A display device including such a decoration film has a fine appearance.

While the present invention has been illustrated and described with reference to some exemplary embodiments thereof, it will be apparent to those of ordinary skill in the art that various changes in form and detail may be made thereto without departing from the spirit and scope of the present invention.

What is claimed is:

1. A decoration film comprising:
a base film;
a first decoration portion on a surface of the base film; and
a second decoration portion on another surface of the base film, and overlapping the first decoration portion,
wherein the first decoration portion comprises a first concavo-convex portion on at least a portion of the base film,
the second decoration portion comprises a second concavo-convex portion on at least a portion of the base film corresponding to the first concavo-convex portion,
the decoration film further comprises a first deposition layer on the first concavo-convex portion and a second deposition layer on the second concavo-convex portion, at least one of the first deposition layer and the second deposition layer comprising a first surface facing toward the base film, a second surface opposite the first surface, and a concavo-convex portion at the second surface, and
each of the first deposition layer and the second deposition layer comprises at least one of a metal, a metal oxide, and a metal nitride.

2. The decoration film as claimed in claim 1, wherein the second decoration portion further comprises a light blocking print layer on the second concavo-convex portion.

3. The decoration film as claimed in claim 1, wherein the first concavo-convex portion and the second concavo-convex portion comprise a polymer resin.

4. The decoration film as claimed in claim 1, wherein the first concavo-convex portion has a refractive index from 1.7 to 2.8.

5. The decoration film as claimed in claim 1, wherein the first decoration portion further comprises a light transmitting print layer on the first concavo-convex portion.

6. The decoration film as claimed in claim 1, wherein the first decoration portion further comprises a light transmitting print layer between the base film and the first concavo-convex portion.

7. The decoration film as claimed in claim 1, further comprising a first polymer resin layer between the base film and the first concavo-convex portion.

8. The decoration film as claimed in claim 7, wherein the first concavo-convex portion is formed integrally with the first polymer resin layer.

9. The decoration film as claimed in claim 1, further comprising a second polymer resin layer between the base film and the second concavo-convex portion.

10. The decoration film as claimed in claim 9, wherein the second concavo-convex portion is formed integrally with the second polymer resin layer.

11. The decoration film as claimed in claim 1, wherein
the first concavo-convex portion comprises a plurality of first linear convex portions spaced apart from each other, and
the second concavo-convex portion comprises a plurality of second linear convex portions spaced apart from each other.

12. The decoration film as claimed in claim 11, wherein the first linear convex portions and the second linear convex portions are parallel to each other.

13. The decoration film as claimed in claim 11, wherein the first linear convex portions and the second linear convex portions are not parallel to each other.

14. A method of manufacturing a decoration film, the method comprising:
forming a first polymer resin layer on a surface of a base film;
forming a first concavo-convex portion on at least a portion of the first polymer resin layer;
applying a polymer resin over another surface of the base film to form a second polymer resin layer;
forming a second concavo-convex portion on at least a portion of the second polymer resin layer; and
forming a first deposition layer on the first concavo-convex portion and forming a second deposition layer on the second concavo-convex portion, at least one of the first deposition layer and the second deposition layer comprising a first surface facing toward the base film, a second surface opposite the first surface, and a concavo-convex portion at the second surface,
wherein each of the first deposition layer and the second deposition layer comprises at least one of a metal, a metal oxide, and a metal nitride.

15. The method as claimed in claim 14, wherein forming of the first deposition layer on the first concavo-convex portion comprises:
forming a deposition layer over an entire surface of the first polymer resin layer including the first concavo-convex portion;
forming a mask over a portion of the deposition layer overlapping the first concavo-convex portion; and
removing portions of the deposition layer other than portions above the first concavo-convex portion.

16. The method as claimed in claim 14, wherein forming of the second deposition layer on the second concavo-convex portion comprises:
forming a deposition layer over an entire surface of the second polymer resin layer including the second concavo-convex portion;
forming a light blocking print layer on a portion of the deposition layer overlapping the second concavo-convex portion; and
removing portions of the deposition layer other than portions above the second concavo-convex portion using the light blocking print layer as a mask.

17. The method as claimed in claim 14, further comprising: forming a light transmitting print layer on the surface of the base film, before forming the first polymer resin layer on the surface of the base film.

18. The method as claimed in claim 15, further comprising: forming a light transmitting print layer on the first deposition layer.

19. A cover panel comprising:
a plate substrate;
an adhesive layer on the plate substrate; and
a decoration film on the adhesive layer,
wherein the decoration film comprises:
a base film;
a first decoration portion on a surface of the base film; and
a second decoration portion on another surface of the base film, and overlapping the first decoration portion, the first decoration portion comprises a first concavo-convex portion on at least a portion of the base film, the second decoration portion comprises a second concavo-convex portion on at least a portion of the base film corresponding to the first concavo-convex portion, the decoration film further comprises a first deposition layer on the first concavo-convex portion and a second deposition layer on the second concavo-convex portion, at least one of the first deposition layer and the second deposition layer comprising a first surface facing toward the base film, a second surface opposite the first surface, and a concavo-convex portion at the second surface, and each of the first deposition layer and the second deposition layer comprises at least one of a metal, a metal oxide, and a metal nitride.

20. The cover panel as claimed in claim 19, wherein the first decoration portion is arranged toward the adhesive layer.

21. The cover panel as claimed in claim 19, wherein the first concavo-convex portion has a refractive index greater than a refractive index of the adhesive layer.

22. The cover panel as claimed in claim 21, wherein the refractive index of the first concavo-convex portion is greater than the refractive index of the adhesive layer by 0.3 or more.

23. The cover panel as claimed in claim 19, wherein the second decoration portion further comprises a light blocking print layer on the second concavo-convex portion.

24. The cover panel as claimed in claim 23, wherein the plate substrate has light transmittance.

25. A display device comprising:
a display panel including a display area and a non-display area; and
a cover panel on the display panel,
wherein the cover panel comprises:
a plate substrate;
an adhesive layer on the plate substrate; and
a decoration film on the adhesive layer, and
the decoration film comprises:
a base film;
a first concavo-convex portion on at least a portion of a surface of the base film,
a second concavo-convex portion on at least a portion of another surface of the base film corresponding to the first concavo-convex portion,
a first deposition layer on the first concavo-convex portion and a second deposition layer on the second concavo-convex portion, at least one of the first deposition layer and the second deposition layer comprising a first surface facing toward the base film, a second surface opposite the first surface, and a concavo-convex portion at the second surface, and
each of the first deposition layer and the second deposition layer comprises at least one of a metal, a metal oxide, and a metal nitride.

26. The display device as claimed in claim 25, wherein the first concavo-convex portion and the second concavo-convex portion overlap the non-display area of the display panel.

* * * * *